(12) United States Patent
Kawamura et al.

(10) Patent No.: US 10,581,338 B2
(45) Date of Patent: Mar. 3, 2020

(54) POWER SUPPLY SYSTEM

(71) Applicants: National University Corporation YOKOHAMA National University, Yokohama-shi (JP); TOSHIBA MITSUBISHI-ELECTRIC INDUSTRIAL SYSTEMS CORPORATION, Chuo-ku (JP)

(72) Inventors: Atsuo Kawamura, Yokohama (JP); Mohammad Bani Shamseh, Chuo-ku (JP); Teruo Yoshino, Chuo-ku (JP)

(73) Assignees: National University Corporation YOKOHAMA National University, Yokohama-shi (JP); TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/331,877

(22) PCT Filed: Sep. 14, 2016

(86) PCT No.: PCT/JP2016/077129
§ 371 (c)(1),
(2) Date: Mar. 8, 2019

(87) PCT Pub. No.: WO2018/051433
PCT Pub. Date: Mar. 22, 2018

(65) Prior Publication Data
US 2019/0214918 A1    Jul. 11, 2019

(51) Int. Cl.
*H02M 5/458*    (2006.01)
*H02M 1/08*    (2006.01)
*H02M 1/44*    (2007.01)

(52) U.S. Cl.
CPC .......... *H02M 5/4585* (2013.01); *H02M 1/08* (2013.01); *H02M 1/44* (2013.01)

(58) Field of Classification Search
CPC ........ H02M 5/4585; H02M 1/08; H02M 1/44; H02M 7/493; H02J 3/46
See application file for complete search history.

(56) References Cited

U.S. PATENT DOCUMENTS 8,379,416 B1 *    2/2013    Datta .................. H02M 5/4505
                                                              363/34

FOREIGN PATENT DOCUMENTS

| JP | 4-217822 A | 8/1992 |
| JP | 11-089250 A | 3/1999 |
| JP | 2016-082661 A | 5/2016 |

OTHER PUBLICATIONS

International Search Report dated Oct. 25, 2016 in PCT/JP2016/077129 filed on Sep. 14, 2016.

(Continued)

*Primary Examiner* — Kyle J Moody
(74) *Attorney, Agent, or Firm* — Oblon, McClelland, Maier & Neustadt, L.L.P.

(57) ABSTRACT

A power supply system includes a plurality of AC output converters connected in parallel for supplying electric power to an AC load. Each of the plurality of AC output converters includes an output impedance connected to the AC load, a PWM converter configured to convert DC power into AC power, and a controller configured to output a voltage command value to the PWM converter. The controller includes a vector adder configured to perform vector addition of a part of a voltage drop occurring due to a current flowing through the output impedance and a voltage command value of the AC load, and a converter configured to (Continued)

output a voltage command value to the PWM converter based on a vector sum obtained through the vector addition.

11 Claims, 20 Drawing Sheets

(56) References Cited

OTHER PUBLICATIONS

Office Action issued Dec. 17, 2019 in Japanese Application No. 2018-539007, along with a partial English translation.

* cited by examiner (A)

(B)

(A)

(B)

POWER SUPPLY SYSTEM

TECHNICAL FIELD

The present invention relates to a power supply system for supplying electric power to a load through a parallel connection of a plurality of alternating-current (AC) output converters each configured to perform power conversion from a direct current into an alternating current.

BACKGROUND ART

There is a known power supply system for supplying electric power to a load through a parallel connection of a plurality of AC output converters each configured to perform power conversion from a direct current into an alternating current.

With regard to the above, Japanese Patent Laying-Open No. 04-217822 discloses a power supply system in which a plurality of AC output converters (such as an inverter) are connected in parallel and operated in parallel to a common load.

As a scheme for controlling the current balance among a plurality of AC output converters, the power supply system is configured to obtain detection signals from the currents output from the plurality of AC output converters to acquire a differential signal thereof, thereby controlling the voltages output from the AC output converters according to the differential signal.

CITATION LIST

Patent Literature

PTL 1: Japanese Patent Laying-Open No. 04-217822

SUMMARY OF INVENTION

Technical Problem

The power supply system in the above-mentioned PTL employs a scheme of acquiring detection signals from the currents output from the AC output converters for controlling the current balance. Thus, it becomes necessary to acquire information from other AC output converters, which requires signal transmitting means to be provided. Thus, a failure occurring in this signal transmitting means may prevent appropriate control.

Furthermore, when one AC output converter is separated for maintenance or when one AC output converter is added for expansion, it becomes necessary to perform complicated steps of disconnecting the signal transmitting means, re-connecting the signal transmitting means, and the like. This requires the entire system to be stopped.

An object of the present invention is to solve the above-described problems and to implement a power supply system capable of balancing currents among a plurality of AC output converters while controlling the plurality of AC output converters independently.

Solution to Problem

A power supply system according to a certain aspect includes a plurality of AC output converters connected in parallel for supplying electric power to an AC load. Each of the plurality of AC output converters includes an output impedance connected to the AC load, a PWM converter configured to convert direct-current (DC) power into AC power, and a controller configured to output a voltage command value to the PWM converter. The controller includes a vector adder configured to perform vector addition of a part of a voltage drop occurring due to a current flowing through the output impedance and a voltage command value of the AC load, and a converter configured to output the voltage command value to the PWM converter based on a vector sum obtained through the vector addition.

Preferably, the output impedance is formed of a reactor.

Preferably, the output impedance is formed of a leakage inductance of a transformer.

Preferably, the controller includes a vector multiplier. The vector multiplier is configured to calculate a part of the voltage drop by multiplying a product of a value of the output impedance and the current flowing through the output impedance by a coefficient smaller than approximately one.

Preferably, the controller includes a detector configured to detect the current flowing through the output impedance, and a reference phase signal generation circuit configured to generate a reference phase signal in synchronization with an AC system voltage, the reference phase signal being for detecting a current component from a detection result of the detector.

Preferably, the controller includes a detector configured to detect the current flowing through the output impedance, and a reference phase signal generation circuit configured to generate a reference phase signal in synchronization with a voltage on a bus connected to the AC load, the reference phase signal being for detecting a current component from a detection result of the detector.

A power supply system according to another aspect includes a plurality of AC output converters connected in parallel for supplying electric power to an AC load. Each of the plurality of AC output converters includes an LCL filter connected to the AC load, a PWM converter configured to convert DC power into AC power, and a controller configured to output a voltage command value to the PWM converter. The controller includes a detector configured to detect a voltage on a capacitor of the LCL filter, a signal generation circuit configured to generate a voltage reference signal by performing vector addition of a part of a voltage drop occurring due to a current flowing through a reactor and a voltage command value of the AC load, the reactor being provided close to the AC load in the LCL filter, and a voltage controller configured to output the voltage command value to the PWM converter such that the voltage reference signal is equal to the voltage on the capacitor detected by the detector.

Preferably, the reactor provided close to the AC load in the LCL filter is formed of a leakage inductance of a transformer.

Preferably, the signal generation circuit is configured to perform vector addition of a vector product of an impedance of the reactor connected to the AC load of the LCL filter and the current flowing through the reactor, and the voltage command value of the AC load.

Preferably, the controller includes a detector configured to detect the current flowing through the reactor, and a reference phase signal generation circuit configured to generate a reference phase signal in synchronization with an AC system voltage, the reference phase signal being for detecting a current component from a detection result of the detector.

Preferably, the controller includes a detector configured to detect a current flowing through an output impedance, and a reference phase signal generation circuit configured to generate a reference phase signal in synchronization with a voltage on a bus connected to the AC load, the reference phase signal being for detecting a current component from a detection result of the detector.

Advantageous Effects of Invention

The power supply system of the present invention is capable of balancing the currents among a plurality of AC output converters while controlling the plurality of AC output converters independently.

DESCRIPTION OF EMBODIMENTS

In the following, the embodiments will be described with reference to the accompanying the drawings. In the present example, an uninterruptible power supply system (hereinafter abbreviated as a UPS) will be described as a power supply system by way of example.

First Embodiment

In the present embodiment, the uninterruptible power supply system will be described with reference to a parallel configuration of two AC output converters.

Figure 1:
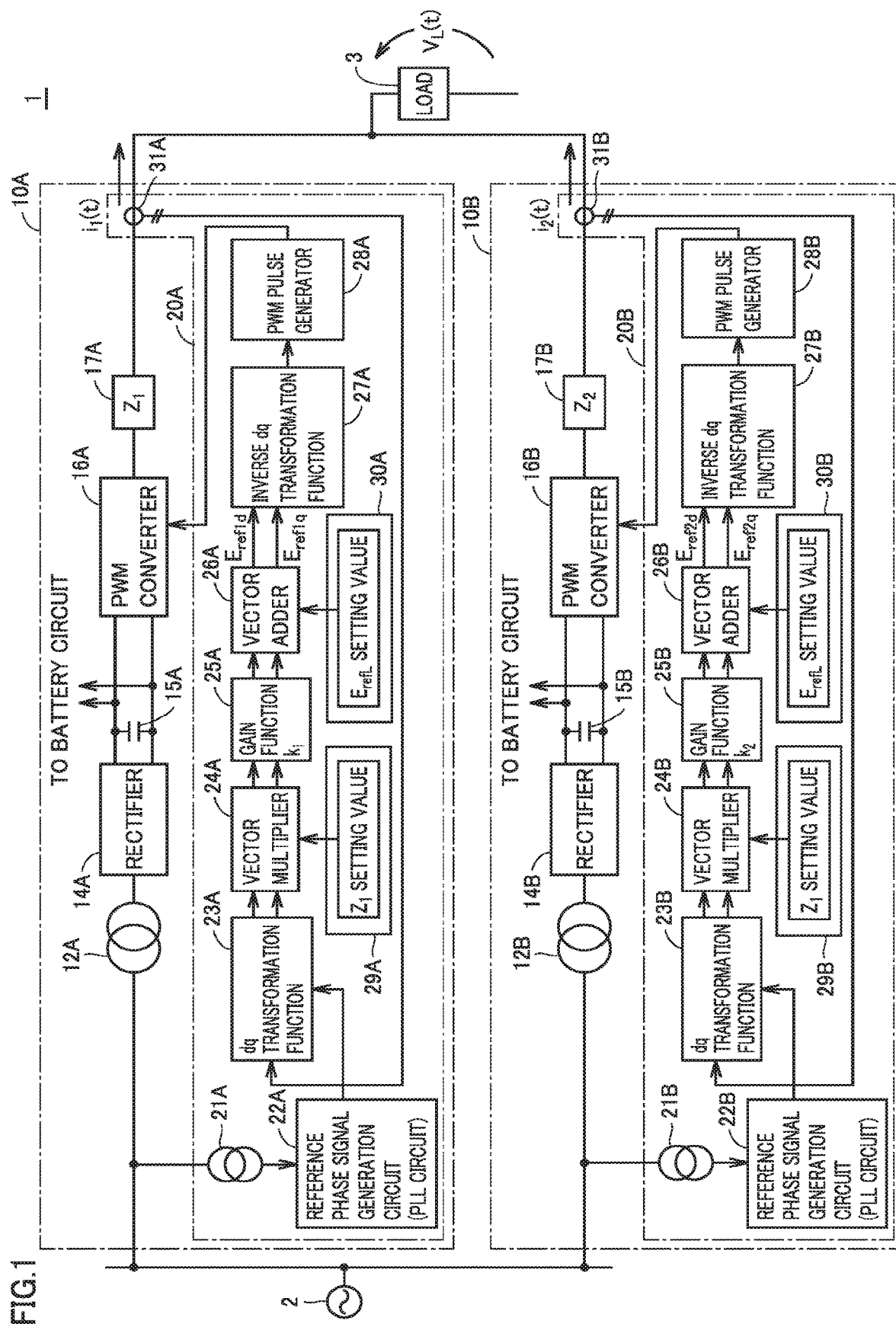
FIG. 1 is a diagram illustrating the configuration of an uninterruptible power supply system 1 according to the first embodiment.

FIG. 1 is a diagram illustrating the configuration of an uninterruptible power supply system 1 according to the first embodiment.

Referring to FIG. 1, uninterruptible power supply system 1 includes an AC output converter (the first AC output converter) 10A and an AC output converter (the second AC output converter) 10B. AC output converters 10A and 10B (which will be also collectively referred to as an AC output converter 10) are connected to an AC power supply 2 and operated in parallel to a common load 3.

AC output converters 10A and 10B according to the present first embodiment perform autonomous control with no input of the signal transmitting means from each other's AC output converter.

In the following, the configuration of each of AC output converters 10A and 10B will be described.

AC output converter 10A includes a transformer 12A, a rectifier 14A configured to convert an AC voltage into a DC voltage, a DC capacitor 15A, a pulse width modulation (PWM) converter 16A, an output impedance 17A, and a controller 20A.

In the stage subsequent to rectifier 14A, DC capacitor 15A is provided so as to keep the DC voltage approximately constant. Rectifier 14A and DC capacitor 15A form a DC circuit.

Also in the present example, the DC circuit is connected to a battery, though not shown. Thereby, electric power can be supplied from the battery to a load in the event of a loss of the AC power supply.

In the normal state, electric power from AC power supply 2 is obtained through rectifier 14A and converted into a DC voltage.

Furthermore, PWM converter 16A is connected to the stage subsequent to DC capacitor 15A.

PWM converter 16A converts DC power into AC power according to gate signals from controller 20A.

In the present example, the main circuit of the AC output converter is simplified but is formed in a three-phase circuit in many cases.

AC output converter 10B is basically identical in configuration to AC output converter 10A. AC output converter 10B includes a transformer 12B, a rectifier 14B configured to convert an AC voltage into a DC voltage, a DC capacitor 15B, a PWM converter 16B, an output impedance 17B, and a controller 20B.

The output impedance is formed of a reactor.

Figure 2:
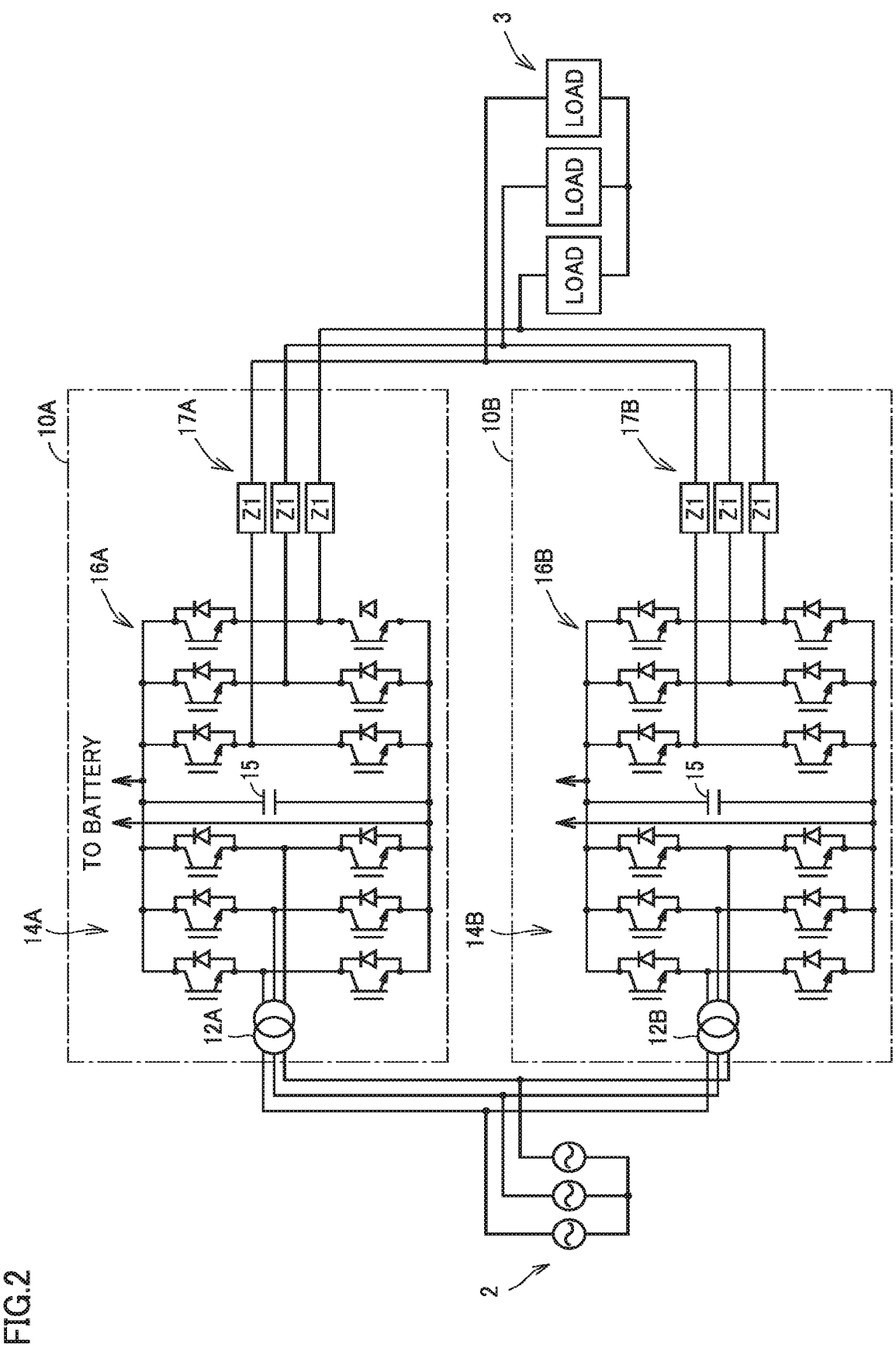
FIG. 2 is a diagram illustrating the configuration of an AC output converter 10 of a three-phase circuit according to the first embodiment.

FIG. 2 is a diagram illustrating the configuration of an AC output converter 10 of a three-phase circuit according to the first embodiment.

FIG. 2 shows rectifier 14A including: a plurality of (six) switching elements (for example, IGBT); and semiconductor elements formed of diodes connected in anti-parallel thereto. The switching elements are bridge-connected.

Furthermore, PWM converter 16A is provided with a plurality of (six) switching elements (for example, IGBT) and semiconductor elements formed of diodes connected in anti-parallel thereto.

The switching elements are controlled to be ON and OFF according to the gate signal from controller 20A.

In order to simplify the explanation, the present example will be described with reference to a one-line diagram and a phasor (vector) diagram by which a three-phase circuit can be collectively represented.

Again referring to FIG. 1, controller 20A includes a voltage detector 21A, a reference phase signal generation circuit 22A (a PLL circuit), a dq transformation function 23A, a vector multiplier 24A, a gain function 25A, a vector adder 26A, a inverse dq transformation function 27A, a PWM pulse generator 28, registers 29A, 30A, and a current detector 31A.

Reference phase signal generation circuit 22A generates a reference phase signal according to a voltage detection signal from voltage detector 21A.

Reference phase signal generation circuit 22A outputs a reference phase signal to dq transformation function 23A.

Also, dq transformation function 23A receives an input of the current detection signal from current detector 31A.

Then, dq transformation function 23A calculates the amplitude and the phase of the current based on the reference phase signal and the current detection signal from current detector 31A, to obtain vector information about the current.

The dq transformation method is a method of transformation for obtaining a d-axis current component in synchronization with the reference phase signal and a q-axis current component shifted by 90 degrees based on the current instantaneous value signal.

Vector multiplier 24A calculates a vector product of the output impedance value ($\vec{Z}_1$ setting value) stored in register 29A with respect to the vector information obtained by dq transformation function 23A.

Gain function 25A multiplies the vector product obtained from vector multiplier 24A by the gain corresponding to a coefficient $k_1$. Vector adder 26A performs vector addition of the output from gain function 25A and the load voltage reference value ($\vec{E}_{refL}$ setting value) stored in register 30A.

The load voltage reference is a voltage required by the load and normally is a rated voltage thereof, but not limited thereto and may be set at a value higher than or lower than the rated voltage.

In the present example, the configuration including register 30A will be described. However, without being limited to a register, any storage means capable of storing information may be employed, and the information may also be stored in a memory. The same also applies to other configurations.

Vector adder 26A outputs the vector sum obtained through vector addition as a load voltage command.

Then, inverse dq transformation function 27A performs inverse dq transformation of the load voltage command from vector adder 26A to generate a voltage reference. PWM pulse generator 28A controls the output voltage from PWM converter 16A according to the voltage reference obtained by the inverse dq transformation.

Since controller 20B is the same as controller 20A, the detailed description thereof will not be repeated.

In the following, the effect of the AC output converter according to the first embodiment will be described.

Figure 3:
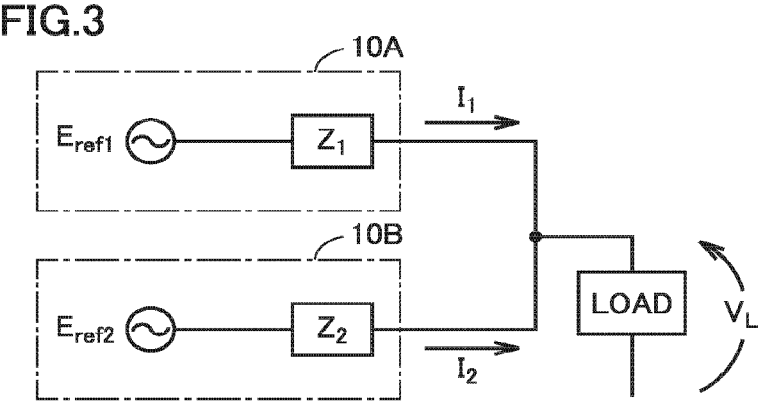
FIG. 3 is a diagram schematically showing uninterruptible power supply system 1 according to the first embodiment.

FIG. 3 is a diagram schematically showing uninterruptible power supply system 1 according to the first embodiment.

As shown in FIG. 3, uninterruptible power supply system 1 is formed of AC output converters 10A and 10B connected in parallel to common load 3.

PWM converter 16A and the control thereof are represented as an equivalent voltage source $\vec{E}_{ref1}$ and the configuration of voltage source $\vec{Z}_{ref1}$ and an output impedance ($\vec{Z}_1$) connected in series is schematically shown.

Similarly, also in AC output converter 10B, PWM converter 16 and the control thereof are represented as an equivalent voltage source $\vec{E}_{ref2}$, and the configuration of a voltage source $\vec{E}_{ref2}$ and an output impedance ($\vec{Z}_2$) connected in series is schematically shown.

Controller 20A causes dq transformation function 23 to perform dq transformation of the current flowing through output impedance 17A ($\vec{Z}_1$) to obtain vector information $\vec{I}_1$ about the current. Vector multiplier 24A performs vector multiplication of this current vector and impedance $\vec{Z}_1$ to obtain a vector product $\vec{Z}_1 \cdot \vec{I}_1$. Also by way of example, gain function 25A is used herein as means for obtaining a part of the vector product to multiply a coefficient scalar $k_1$ smaller than one and the vector product to thereby obtain $k_1 \cdot \vec{Z}_1 \cdot \vec{I}_1$. Vector adder 26 performs vector addition of a load voltage command $\vec{E}_{refL}$ to $k_1 \cdot \vec{Z}_1 \cdot \vec{I}_1$, thereby obtaining a voltage command value $\vec{E}_{ref1}$ of AC output converter 10A. The voltage command value is represented by the following equation (1).

$$\vec{E}_{ref1} = \vec{E}_{refL} + k_1 \cdot \vec{Z}_1 \cdot \vec{I}_1 \tag{1}$$

Similarly, the voltage command value of AC output converter 10B is obtained. The voltage command value is represented by the following equation (2). In the equation (2), $\vec{I}_2$ shows a current flowing through an output impedance $\vec{Z}_2$ of AC output converter 10B. AC output converter 10B employs a gain coefficient $k_2$.

$$\vec{E}_{ref2} = \vec{E}_{refL} + k_2 \cdot \vec{Z}_2 \cdot \vec{I}_2 \tag{2}$$

On the other hand, an actual electrical circuit is constituted of an AC voltage source formed of a PWM converter, an output impedance and a load, as shown in FIG. 2.

Assuming that the load voltage is defined as $\vec{V}_L$, the voltage/current equation of the electrical circuit is represented by the following equation. In this case, it is assumed that the PWM converter is ideally controlled, so that the actual output voltage is equal to the voltage command value with neither delay nor error.

$$\vec{E}_{ref1} = \vec{V}_L + \vec{Z}_1 \cdot \vec{I}_1 \tag{3}$$

$$\vec{E}_{ref2} = \vec{V}_L + \vec{Z}_2 \cdot \vec{I}_2 \tag{4}$$

In this case, assuming that the impedance of the load is defined as $\vec{Z}_L$, load voltage $\vec{V}_L$ is represented by the following equation.

$$\vec{V}_L = \vec{Z}_L (\vec{I}_1 + \vec{I}_2) \tag{5}$$

When the left hand side of the equation (3) is replaced with the right hand side of the equation (1), the following equation is obtained.

$$\vec{E}_{refL} + k \cdot \vec{Z}_1 \cdot \vec{I}_1 = \vec{V}_L + \vec{Z}_1 \cdot \vec{I}_1 \quad (6)$$

When the above equation is converted, the following equation (7) is obtained.

$$\vec{E}_{refL} = \vec{V}_L + (1-k_1)\vec{Z}_1 \cdot \vec{I}_1 \quad (7)$$

The same also applies to the equation (4) of AC output converter 10B to thereby obtain the following equation.

$$\vec{E}_{refL} = \vec{V}_L + (1-k_2)\vec{Z}_2 \cdot \vec{I}_2 \quad (8)$$

The equations (3) and (4) are represented by an equivalent circuit in which a current is supplied to a load from AC power supply $\vec{E}_{refL}$, through a parallel circuit including two equivalent output impedances of $(1-k_1)\vec{Z}_1$ and $(1-k_2)\vec{Z}_2$, as shown in FIG. 3.

Figure 4:
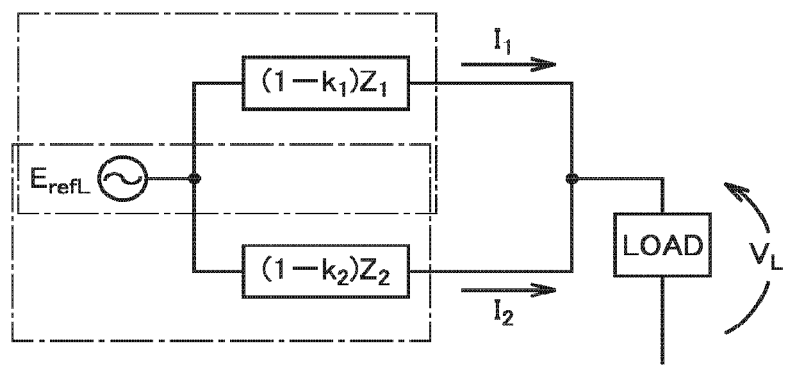
FIG. 4 is a diagram illustrating an equivalent circuit according to the first embodiment.

FIG. 4 is a diagram illustrating an equivalent circuit according to the first embodiment.

Referring to FIG. 4, an equivalent circuit according to the above equations (7) and (8) is shown.

The sharing ratio of currents $\vec{I}_1$ and $\vec{I}_2$ supplied to load 3 from AC output converters 10A and 10B is determined by the ratio of the equivalent output impedances.

Specifically, when the equations (7) and (8) are converted such that the right hand sides of the equations (7) and (8) are equal, the following equation is obtained.

$$(1-k_1)\vec{Z}_1 \cdot \vec{I}_1 = (1-k_2)\vec{Z}_2 \cdot \vec{I}_2 \quad (9)$$

Based on the above relation, the sharing ratio of $\vec{I}_1$ and $\vec{I}_2$ is represented by the following equation.

$$\frac{\vec{I}_2}{\vec{I}_1} = \frac{(1-k_1)\vec{Z}_1}{(1-k_2)\vec{Z}_2} \quad (10)$$

When AC output converters 10A and 10B are formed of the same type of circuit, the result is $\vec{Z}_1 = \vec{Z}_2$. Furthermore, assuming that the coefficient used in control is equal in which case $k_1 = k_2$, it turns out that the currents supplied from two AC output converters 10A and 10B to load 3 are equally shared in the steady state, which results in $\vec{I}_1 = \vec{I}_2$.

As described above, by using controllers 20A and 20B according to the embodiment of the present invention, the currents in two AC output converters 10A and 10B can be balanced or shared as appropriate.

Since a delay occurs in actual control, it takes some time to reach the above-described steady state, which will be specifically described below.

In order to simplify the explanation, it is assumed that AC output converters 10A and 10B have the same output impedance $\vec{Z}$ and are controlled using the same coefficient k.

In the state where AC output converter 10A supplies all the current to load 3 as an initial state, a switch SW is closed so that AC output converter 10B is connected, which subsequently leads to a gradual increase in the output current of AC output converter 10A, so that the current is balanced, which will be hereinafter specifically described.

Figure 5:
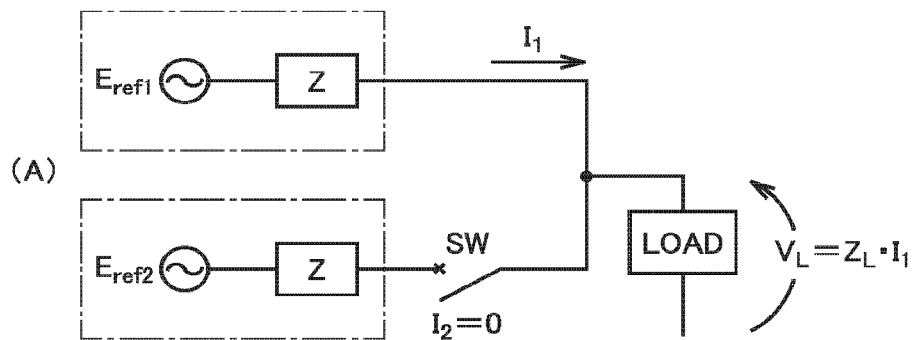
FIG. 5 is a diagram illustrating the initial state of uninterruptible power supply system 1 according to the first embodiment.
Figure 5:
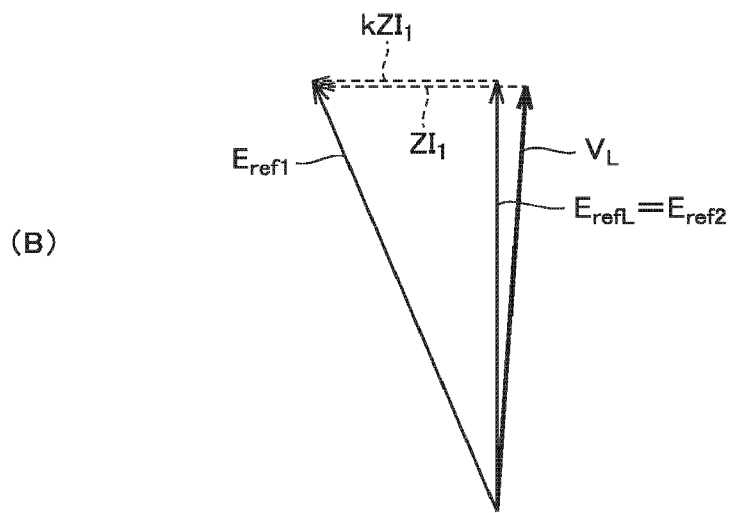

FIG. 5 is a diagram illustrating the initial state of uninterruptible power supply system 1 according to the first embodiment.

FIG. 5 (A) shows an equivalent circuit diagram in the initial state.

FIG. 5 (B) shows a vector diagram (phasor diagram) in the initial state.

The vector diagram is illustrated assuming that the output impedance is a reactor and the output impedance is mainly formed of an inductance.

Furthermore, the load is represented as a resistance R of a unity power factor.

The equation of the current and the voltage before switch SW is closed is represented by the following equation.

$$\vec{E}_{ref1} = \vec{E}_{refL} + k \cdot \vec{Z}_1 \cdot \vec{I}_1 = \vec{V}_L + \vec{Z} \cdot \vec{I}_1 \quad (11)$$

$$\vec{V}_L = \vec{Z}_L \cdot \vec{I}_1 \quad (12)$$

The voltage reference of the AC output converter is represented by the following equation since the output current is zero (0).

$$\vec{E}_{ref2} = \vec{E}_{refL} \quad (13)$$

When switch SW is closed, AC output converters 10A and 10B are to be connected as voltage sources to the load.

At this moment, the load voltage and the current share change. Assuming that the changed load voltage is defined as $\vec{V}'_L$ and the currents from AC output converters are defined as $\vec{I}'_1$ and $\vec{I}'_2$, the following equation is established. It is to be noted that voltage references $\vec{E}_{ref1}$ and $\vec{E}_{ref2}$ do not change since a delay occurs in control.

$$\vec{E}_{ref1} = \vec{E}_{refL} + k \cdot \vec{Z} \cdot \vec{I}_1 = \vec{V}'_L + \vec{Z} \cdot \vec{I}'_1 \quad (14)$$

$$\vec{E}_{ref2} = \vec{E}_{refL} = \vec{V}'_L + \vec{Z} \cdot \vec{I}'_2 \quad (15)$$

$$\vec{V}'_L = \vec{Z}_L (\vec{I}'_1 + \vec{I}'_2) \quad (16)$$

Addition of the equations (14) and (15) leads to the following equation.

$$2\vec{E}_{refL} + k \cdot \vec{Z} \cdot \vec{I}_1 = 2\vec{V}'_L + \vec{Z}(\vec{I}'_1 + \vec{I}'_2) \quad (17)$$

Based on the equation (16), $$\vec{I}'_1 + \vec{I}'_2 = \frac{\vec{V}'_L}{\vec{Z}_L}$$

is substituted into the above equation (17) and arranged, thereby leading to the following equation.

$$\vec{V}'_L = \frac{2\vec{E}_{refL} + k \cdot \vec{Z} \cdot \vec{I}_1}{2 + \vec{Z}/\vec{Z}_L} \quad (18)$$

Current $\vec{I}'_2$ of AC output converter 10B is obtained by dividing the difference between the changed load voltage $\vec{V}'_L$ and voltage source $\vec{E}_{ref2}$ by the impedance.

$$\vec{I}'_2 = \frac{\vec{V}_{ref2} - \vec{V}'_L}{\vec{Z}} = \quad (19)$$

-continued $$\frac{1}{\vec{Z}}\left\{\frac{2\vec{E}_{refL} + \frac{\vec{Z}}{\vec{Z}_L}\vec{E}_{refL} - 2\vec{E}_{refL} - k\cdot\vec{Z}\cdot\vec{i}_1}{2+\vec{Z}/\vec{Z}_L}\right\} = \frac{\frac{\vec{E}_{refL}}{\vec{Z}_L} - k\vec{i}_1}{2+\vec{Z}/\vec{Z}_L}$$

In this case, the vector of the load voltage is approximate to the vector of the load voltage reference. Thus, it is considered that the load current does not significantly change from an initial value $\vec{I}_1$ before and after switch SW is closed. In other words, since $$\frac{\vec{V}'_{refL}}{\vec{Z}_L} \approx \vec{i}_1$$

is assumed to be established, a current $\vec{I}'_2$ is obtained by the following approximate equation.

$$I'_2 \approx \frac{\vec{i}_1 - k\vec{i}_1}{2+\vec{Z}/\vec{Z}_L} = \frac{1-k}{2+\vec{Z}/\vec{Z}_L}\vec{i}_1 \quad (20)$$

In this case, 1−k>0 is established. Thus, a current $\vec{I}'_2$ is to have a finite value other than zero (0).

Since the current is to be supplied from AC output converter 10B to load 3, current $\vec{I}_1'$ from AC output converter 10A decreases from $\vec{I}_1$.

After a lapse of the operation delay in control, new $\vec{E}'_{ref2}$ of AC output converter 10B is recalculated by the increased current $\vec{I}_2'$, which results in a vector having a phase slightly advanced from $\vec{E}_{ref2} = \vec{E}_{refL}$ in the initial state.

Since voltage reference $\vec{E}'_{ref1}$ of AC output converter 10A is recalculated using the decreased current $\vec{I}_1'$, it shows a vector delayed from the initial state.

Figure 6:
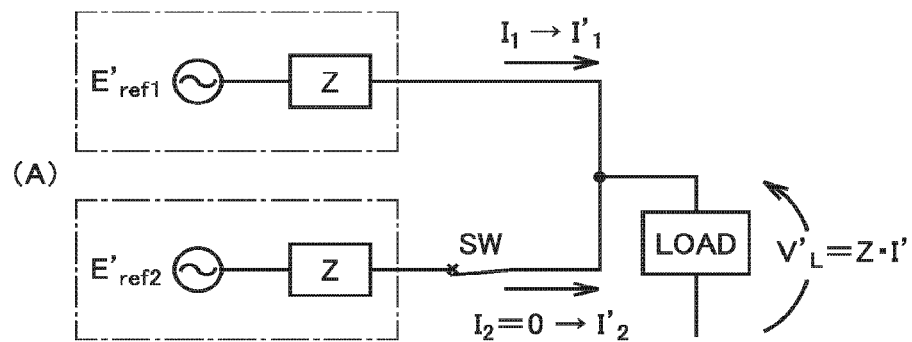
FIG. 6 is a diagram illustrating the state immediately after a switch of uninterruptible power supply system 1 according to the first embodiment is closed.
Figure 6:
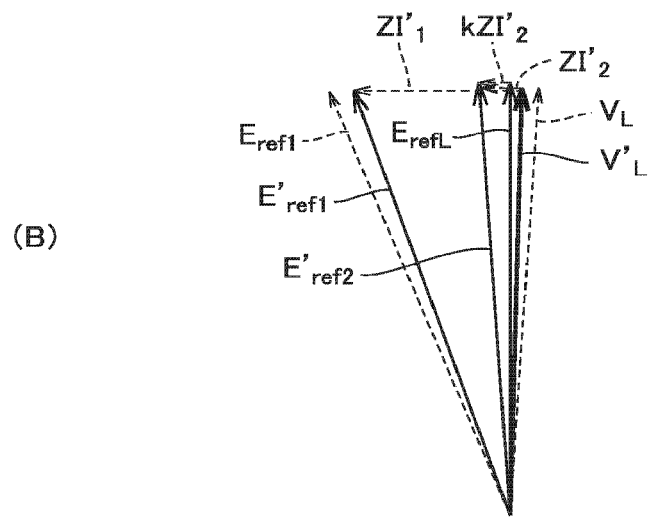

FIG. 6 is a diagram illustrating the state immediately after the switch of uninterruptible power supply system 1 according to the first embodiment is closed.

FIG. 6 (A) shows an equivalent circuit diagram in the state immediately after the switch is closed.

FIG. 6 (B) shows a vector diagram (phasor diagram) in the state where the switch is closed.

Such a motion is repeated. Then, at the point of time when voltage reference $\vec{E}'_{ref2}$ of AC output converter 10B becomes equal to voltage reference $\vec{E}'_{ref1}$ of AC output converter 10A, the currents of AC output converters 10A and 10B are balanced to reach the steady state.

Figure 7:
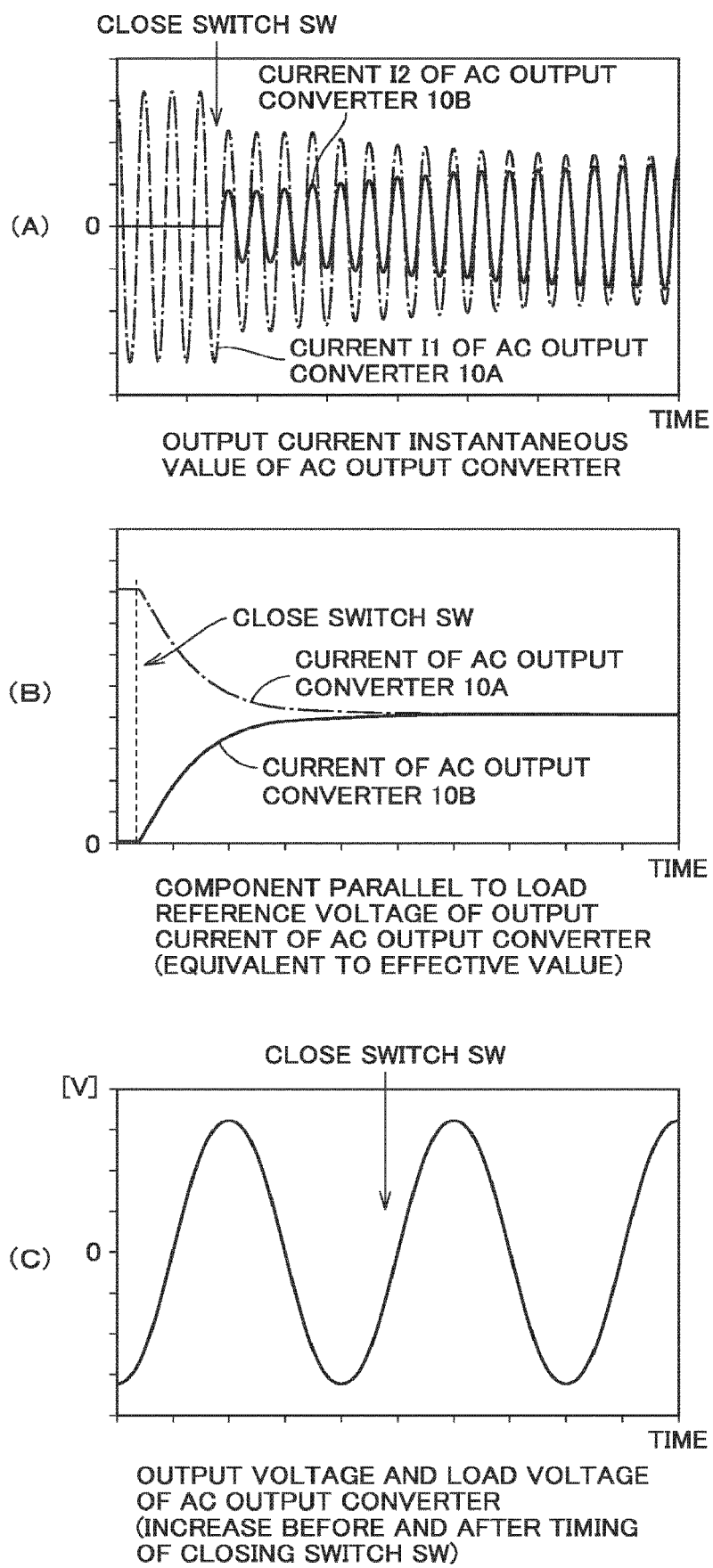
FIG. 7 is a diagram illustrating the simulation result of uninterruptible power supply system 1 according to the first embodiment.

FIG. 7 is a diagram illustrating the simulation result of uninterruptible power supply system 1 according to the first embodiment.

FIG. 7 (A) shows instantaneous values of the output currents of AC output converters 10A and 10B.

FIG. 7 (B) shows waveforms of the components in parallel to the load reference voltages of the output currents of AC output converters 10A and 10B.

FIG. 7 (C) shows the output voltage and the load voltage of each of AC output converters 10A and 10B.

In the present example, the simulation was performed on the model using two single-phase voltage sources that output voltage reference values calculated by controllers 20A and 20B, as a simple system. Assuming that a reactor is used as an output impedance, the waveform of the simulation result is shown.

In order to simplify the calculation, in FIG. 7 (B), voltage references $\vec{E}_{ref1}$ and $\vec{E}_{ref2}$ of the AC output converters are calculated using an extraction of only a d-axis component of each output current.

Even the calculation as described above is not different from the calculation using a part of a voltage drop occurring due to the output impedance.

In the simulation, a control delay of about several hundred ms is assumed to occur. Thus, the result shows that the currents of two AC output converters are balanced gradually at about several hundred ms. In this way, the simulation also shows that the effect as indicated by the calculation equation is achieved.

Although the parallel configuration of two AC output converters have been described in the present example, three or more AC output converters may also be similarly applicable.

According to the configuration in the present first embodiment, AC output converters 10A and 10B perform control using only the signals that can be observed by their respective devices, so that the current share or the current balance between AC output converters 10A and 10B can be controlled. Also, control can be performed only by controllers 20A and 20B provided in AC output converters 10A and 10B, respectively. Thus, it becomes possible to eliminate the need to provide: a controller common to a plurality of AC output converters; and signal transmitting/receiving means between the AC output converters.

Accordingly, the independency of each AC output converter is increased, which can also reduce an influence exerted upon the entire system when the AC output converters are partially stopped, when an AC output converter is added for expansion, and the like.

First Modification of First Embodiment

The configuration using a reactor as an output impedance has been explained in the above description. On the one hand, also in the configuration in which a transformer is provided on the output side, the similar effect can be achieved since the short-circuit impedance (leakage impedance) of the output transformer is equivalent to the reactor.

Figure 8:
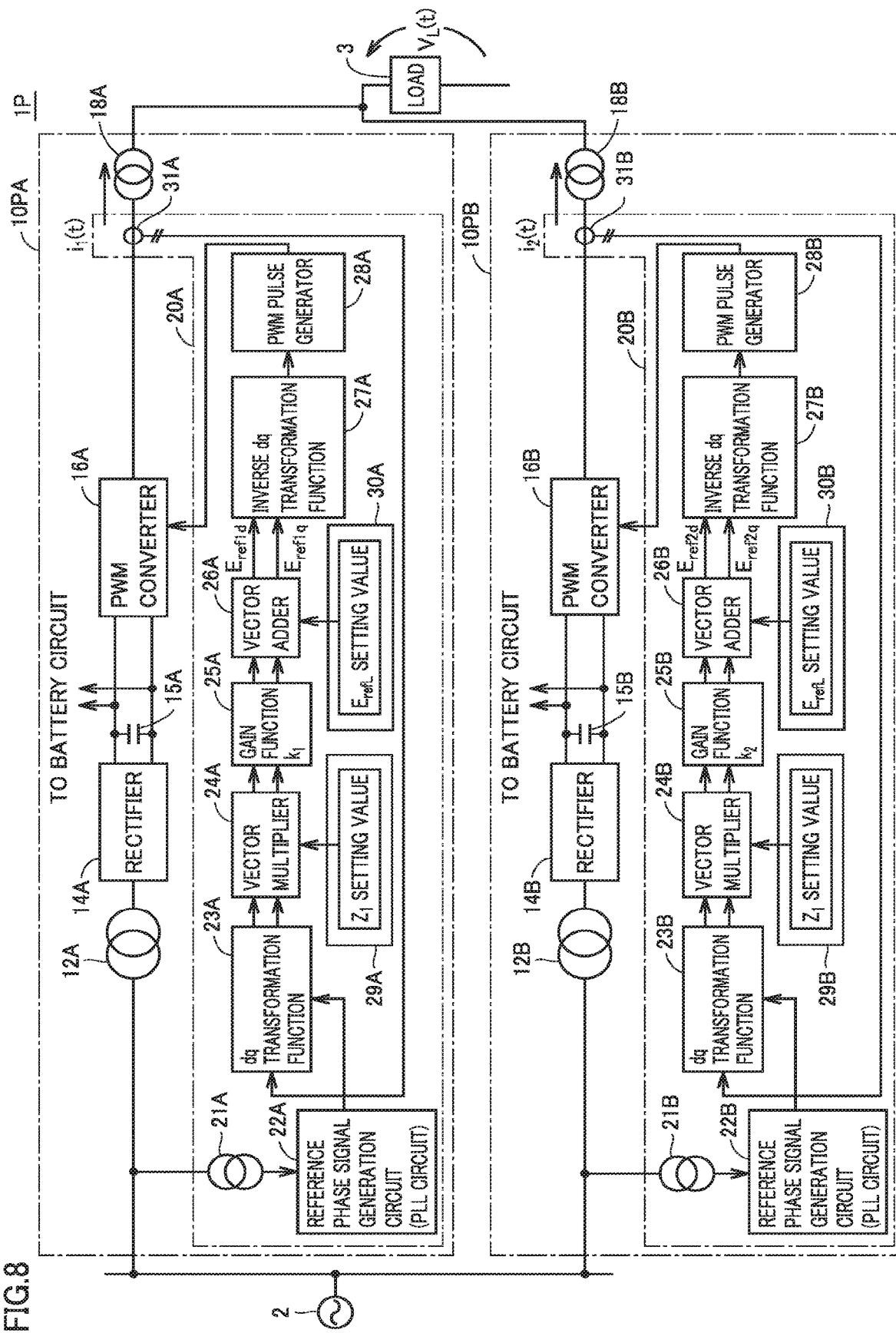
FIG. 8 is a diagram illustrating the configuration of an uninterruptible power supply system 1P according to the first modification of the first embodiment.

FIG. 8 is a diagram illustrating the configuration of an uninterruptible power supply system 1P according to the first modification of the first embodiment.

As shown in FIG. 8, uninterruptible power supply system 1P is different from uninterruptible power supply system 1 in that AC output converter 10A is replaced with an AC output converter 10PA while AC output converter 10B is replaced with an AC output converter 10PB.

AC output converter 10PA is different from AC output converter 10A in that a transformer 18A is provided in place of impedance 17A. Current detector 31A is provided between PWM converter 16A and transformer 18A. Since other configurations are the same as those described in FIG. 1, the detailed description thereof will not be repeated.

Furthermore, AC output converter 10PB is different form AC output converter 10B in that a transformer 18B is provided in place of impedance 17B. Current detector 31B is provided between PWM converter 16B and transformer 18B. Since other configurations are the same as those described in FIG. 1, the detailed description thereof will not be repeated.

The above-mentioned configuration can also achieve the same effect as that in the first embodiment.

Also, current detector 31A may be provided between AC load 3 and transformer 18A while current detector 31B may be provided between AC load 3 and transformer 18B.

Second Modification of First Embodiment

Figure 9:
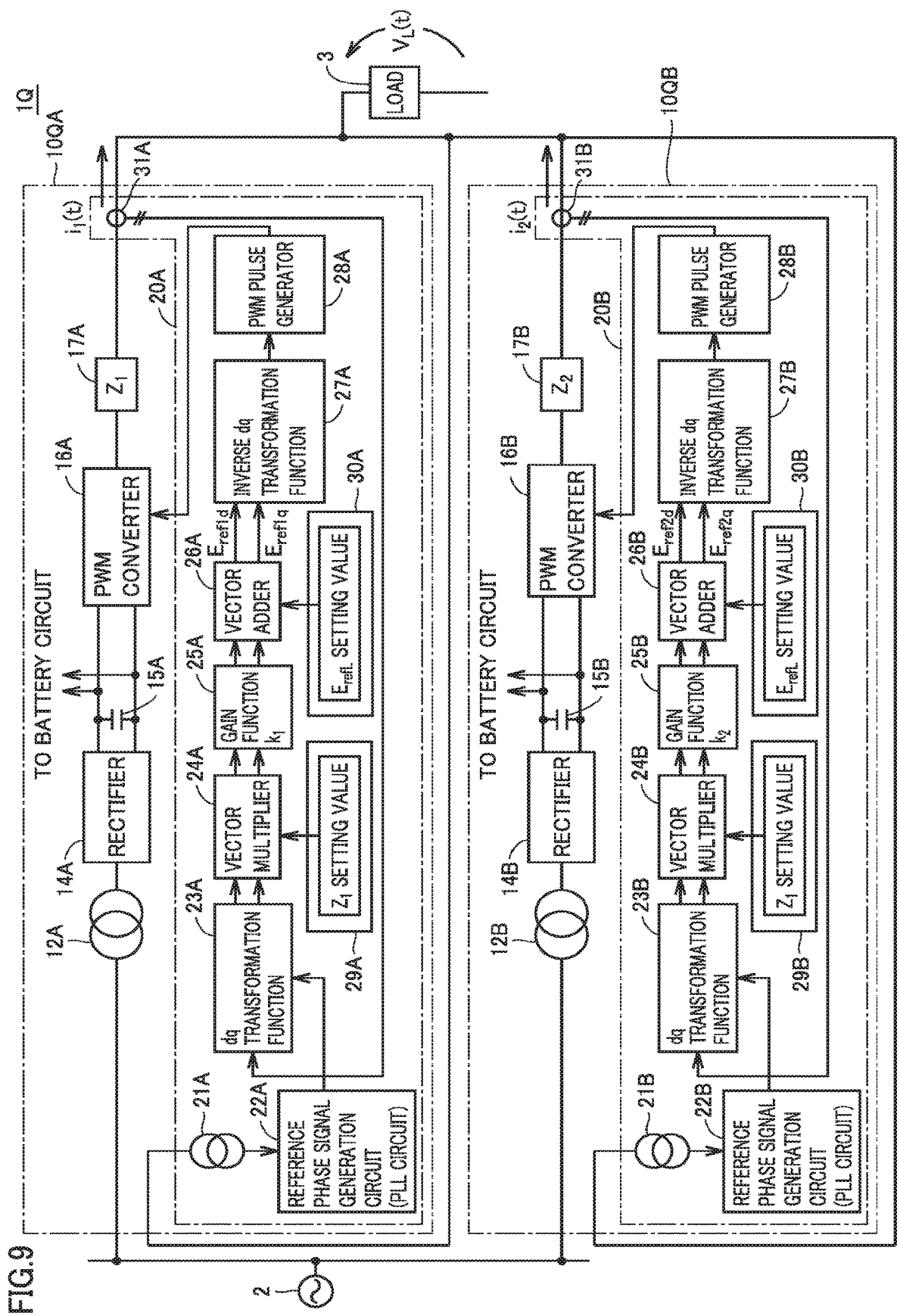
FIG. 9 is a diagram illustrating the configuration of an uninterruptible power supply system 1Q according to the second modification of the first embodiment.

FIG. 9 is a diagram illustrating the configuration of an uninterruptible power supply system 1Q according to the second modification of the first embodiment.

Referring to FIG. 9, uninterruptible power supply system 1Q is different from uninterruptible power supply system 1 in that AC output converter 10A is replaced with an AC output converter 10QA while AC output converter 10B is replaced with an AC output converter 10QB.

AC output converter 10QA is different from AC output converter 10A in that a reference phase is obtained from a voltage on the bus to which load 3 is connected. Since other configurations are the same, the detailed description thereof will not be repeated.

Furthermore, AC output converter 10QB is different from AC output converter 10B in that a reference phase is obtained from a voltage on the bus to which load 3 is connected. Since other configurations are the same, the detailed description thereof will not be repeated. The above-mentioned configuration also achieves the same effect as that in the first embodiment.

Furthermore, the voltage on the bus to which the load is connected is also information common to two AC output converters, and is also information detectable independently by two AC output converters. Thus, the same effect as that in the first embodiment can be achieved.

Second Embodiment

In the second embodiment, another uninterruptible power supply system 1# will be described.

Figure 10:
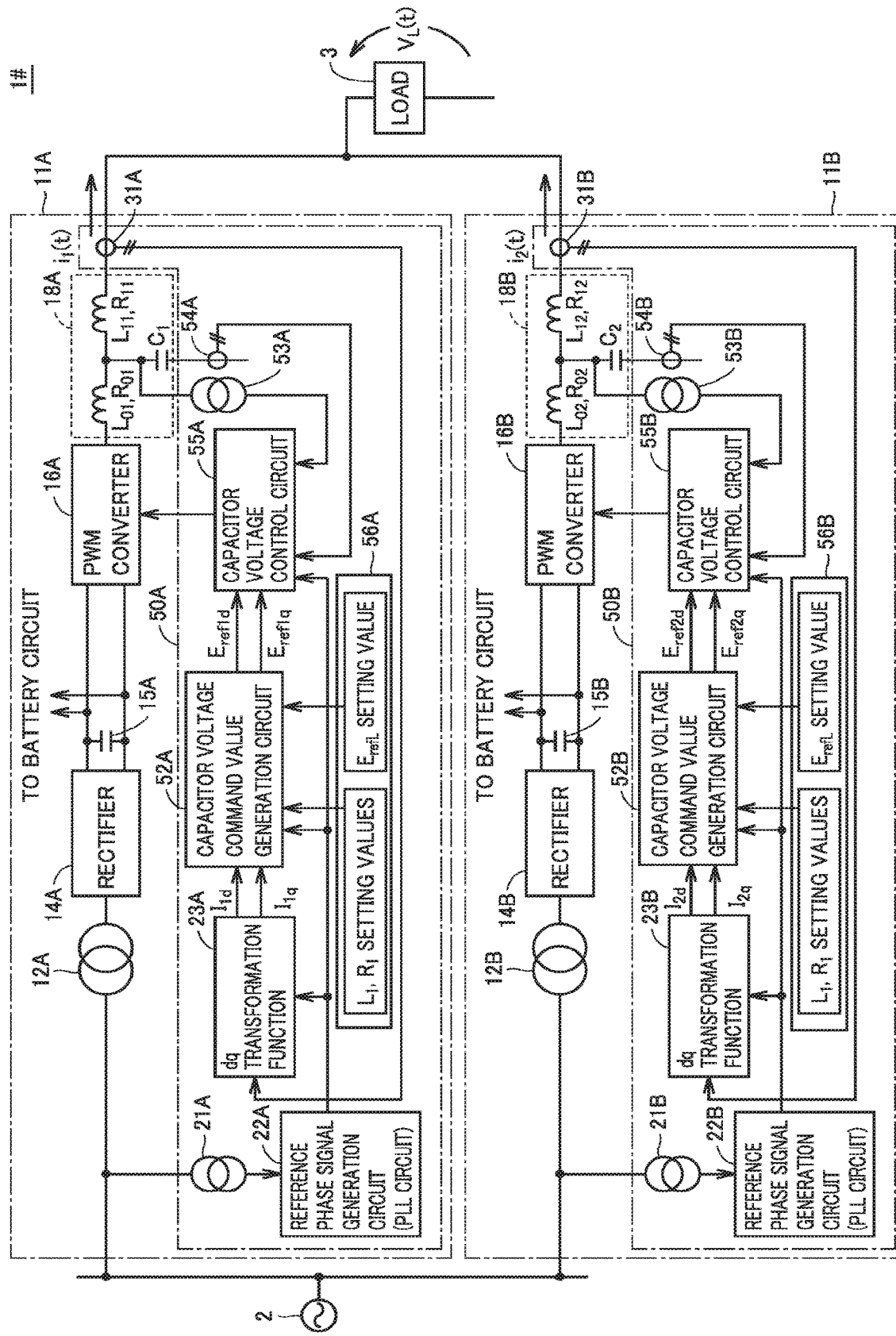
FIG. 10 is a diagram illustrating the configuration of an uninterruptible power supply system 1# according to the second embodiment.

FIG. 10 is a diagram illustrating the configuration of uninterruptible power supply system 1# according to the second embodiment.

Referring to FIG. 10, uninterruptible power supply system 1# includes an AC output converter 11A and an AC output converter 11B. AC output converters 11A and 11B (which will be also collectively referred to as AC output converter 11) are connected to AC power supply 2 and operated in parallel to common load 3.

The present example shows a configuration including an LCL filter provided as an output impedance. The LCL filter serves to reduce the carrier frequency component of the PWM converter and supply a fundamental wave AC voltage to the load.

The present example is different from the first embodiment in that the reference phase signal is obtained from the voltage on the bus to which load 3 is connected.

One of AC output converters 11A and 11B according to the present second embodiment performs autonomous control with no input of the signal transmitting means from the other of AC output converters 11A and 11B.

The following is an explanation about the configuration of each AC output converter 11.

AC output converter 11A includes a transformer 12A, a rectifier 14A configured to convert an AC voltage into a DC voltage, a DC capacitor 15A, a PWM converter 16A, an LCL filter 18A, and a controller 50A.

Controller 50A includes a voltage detector 21A, a reference phase signal generation circuit 22A (a PLL circuit), a dq transformation function 23A, a capacitor voltage command value generation circuit 52A, a capacitor voltage control circuit 55A, a voltage detector 53A, a current detector 54A, and a register 56A.

Capacitor voltage control circuit 55A in controller 50A controls the capacitor voltage in LCL filter 18A.

Voltage detector 53A detects a capacitor voltage. Furthermore, current detector 54A detects a capacitor current flowing through the capacitor.

Current detector 31A measures the output current from AC output converter 11A and inputs the measured current into controller 50A.

Capacitor voltage control circuit 55A is configured to obtain a capacitor voltage through voltage detector 53A to perform feedback control such that the value of the obtained capacitor voltage is equal to the voltage reference signal.

The capacitor voltage signal is converted into a d-axis component and a q-axis component through dq transformation. The output voltage from PWM converter 16A is controlled such that the difference between these signals and a d-axis component $E_{refd}$ and a q-axis component $E_{refq}$ of the voltage reference signal becomes zero.

Figure 11:
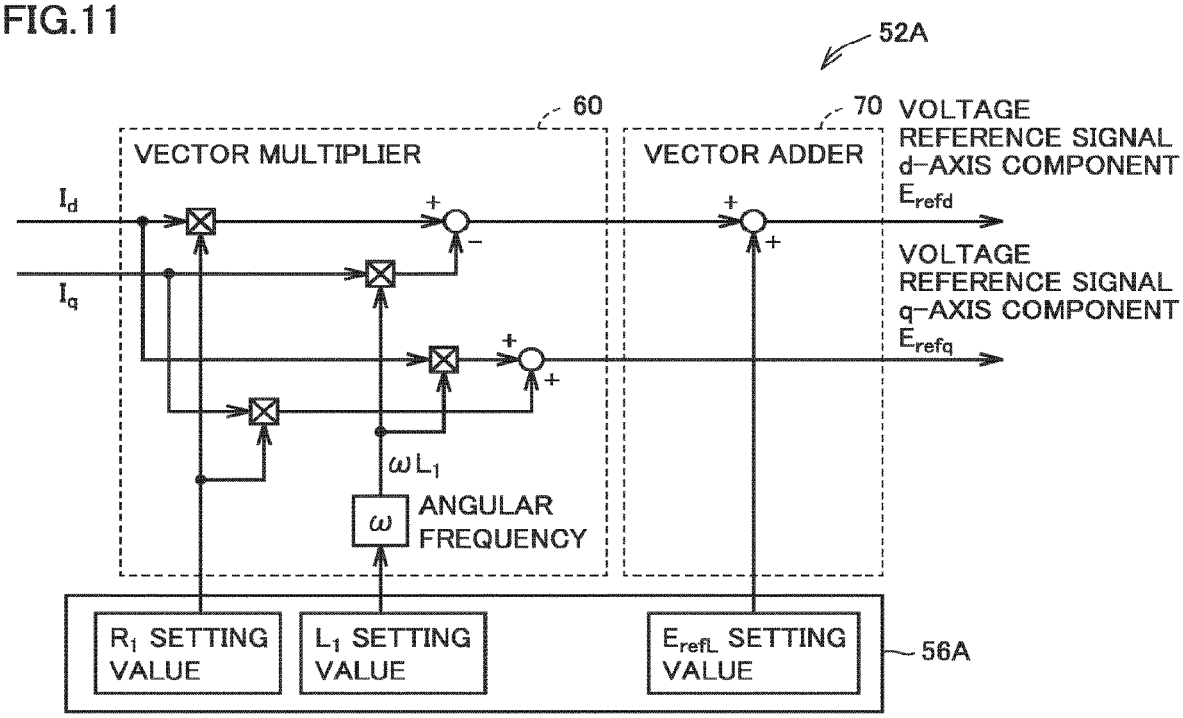
FIG. 11 is a diagram illustrating the configuration of a capacitor voltage command value generation circuit 52A according to the second embodiment.

FIG. 11 is a diagram illustrating the configuration of capacitor voltage command value generation circuit 52A according to the second embodiment.

As shown in FIG. 11, capacitor voltage command value generation circuit 52A includes a vector multiplier 60 and a vector adder 70.

Using the current signal measured by current detector 31A, controller 50A produces a capacitor voltage command value by the calculation shown by the following equation, and controls the capacitor voltage based on the produced value.

$$\vec{E}_{ref1} = \vec{E}_{refL} + \vec{Z}_1 \cdot \vec{I}_1 \tag{21}$$

By the calculation of the equation (21), the capacitor voltage command value is obtained. In the present example, an impedance $\vec{Z}_1$ is an impedance of the load-side reactor in LCL filter 18A, and represented by an inductance $L_1$ and a resistance part $R_1$. Inductance $L_1$ and resistance part $R_1$ are to be stored in register 56A in advance.

Also, dq transformation function 23A receives an input of the current detection signal from current detector 31A.

Then, dq transformation function 23A calculates the amplitude and the phase of the current according to the reference phase signal and the current detection signal from current detector 31A, to obtain the vector information about the current.

Vector multiplier 60 performs vector multiplication to multiply resistance part $R_1$ and an impedance $\omega L_1$, which is obtained by the inductance on the load-side reactor in LCL filter 18A, by the dq-axis component of the vector information about the current, to thereby obtain a vector product.

Vector adder 70 performs vector addition of load voltage command $\vec{E}_{refL}$ to the output from vector multiplier 60 to obtain a capacitor voltage command value of AC output converter 11A. In the present example, load voltage command $\vec{E}_{refL}$ is assumed to be formed only of the component in synchronization with the reference phase. The capacitor voltage command is formed of a voltage reference signal $E_{refd}$ of the d-axis component and a voltage reference signal $E_{refq}$ of the q-axis component.

Figure 12:
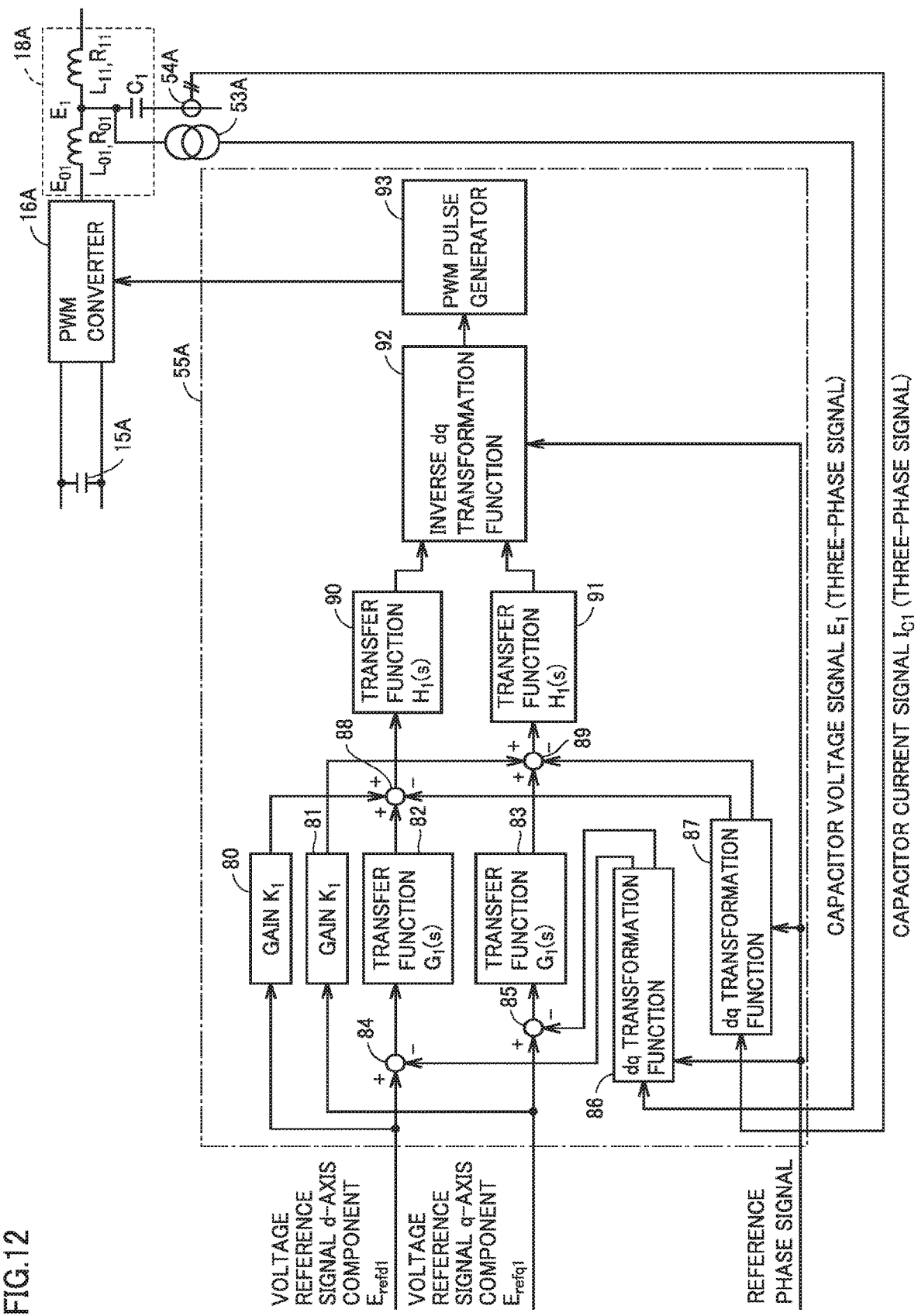
FIG. 12 is a diagram illustrating the configuration of a capacitor voltage control circuit 55A according to the second embodiment.

FIG. 12 is a diagram illustrating the configuration of capacitor voltage control circuit 55A according to the second embodiment.

As shown in FIG. 12, capacitor voltage control circuit 55A includes dq transformation functions 86 and 87, gain (coefficient $k_1$) 80 and 81, transfer function 82 and 83, transfer function 90 and 91, a inverse dq transformation function 92, a PWM pulse generator 93, differential units 84 and 85, and adders 88 and 89.

Differential unit 84 calculates the difference between the voltage reference signal of the d-axis component and the capacitor voltage signal of the d-axis component, and outputs the calculated difference to transfer function 82. Transfer function 82 amplifies the error in differential unit 84 and outputs the amplified error to adder 88.

Adder 88 adds the voltage reference signal proportional to coefficient $k_1$ and the output of transfer function 82, and calculates the difference from the capacitor current signal of the d-axis component. Then, adder 88 outputs the calculated difference to transfer function 90. Transfer function 90 amplifies the error in adder 88 and outputs the amplified error to inverse dq transformation function 92.

The same also applies to the q-axis component.

Specifically, differential unit 85 calculates the difference between the voltage reference signal of the q-axis component and the capacitor voltage signal of the q-axis component, and then, outputs the calculated difference to transfer function 83. Transfer function 83 amplifies the error in differential unit 85 and outputs the amplified error to adder 89.

Adder 89 adds the voltage reference signal proportional to coefficient $k_1$ and the output of transfer function 83 and also calculates the difference from the capacitor current signal of the q-axis component. Then, adder 89 outputs the result to transfer function 91. Transfer function 91 amplifies the error in adder 89 and outputs the amplified error to inverse dq transformation function 92.

Then, inverse dq transformation function 92 performs inverse dq transformation of the output into a three-phase signal and outputs the result to PWM pulse generator 93.

PWM pulse generator 93A controls the output voltage from PWM converter 16A according to the voltage reference obtained by the inverse dq transformation.

Since controller 50B is the same as controller 50A, the detailed description thereof will not be repeated.

Then, the effect of the AC output converter according to the second embodiment will be hereinafter described.

Figure 13:
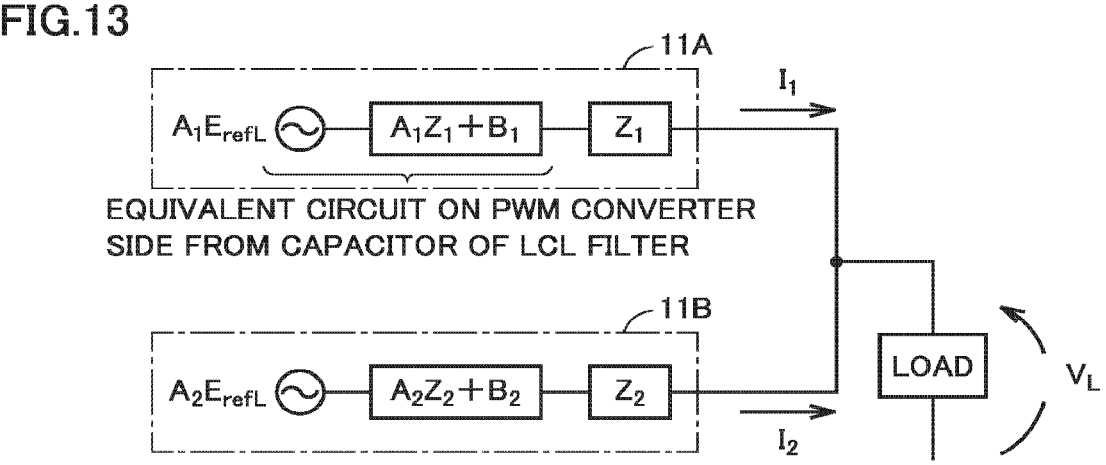
FIG. 13 is a diagram schematically showing uninterruptible power supply system 1# according to the second embodiment.

FIG. 13 is a diagram schematically showing uninterruptible power supply system 1# according to the second embodiment.

As shown in FIG. 13, uninterruptible power supply system 1# includes AC output converters 11A and 11B connected in parallel to common load 3.

The capacitor voltage in LCL filter 18A is controlled to be constant. Thus, the circuit on the PWM converter 16A side including a capacitor can be shown by the Thevenin's equivalent circuit including a voltage source formed of a voltage reference signal $\vec{E}_{ref1}$ and an equivalent impedance connected in series.

In the configuration shown in FIG. 11, it is assumed that the output voltage from the PWM converter is defined as $\vec{E}_{O1}$, the capacitor voltage is defined as $\vec{E}_1$, the capacitor current is defined as $\vec{I}_{C1}$, and the admittance of the capacitor is defined as $\vec{Y}_{C1}$. Thus, the relational expression of the following equation is obtained regarding the current flowing through an impedance $\vec{Z}_{O1}(L_{O1}, R_{O1})$ of the electrical circuit and the capacitor current.

$$\vec{E}_{O1} - \vec{E}_1 = \vec{Z}_{O1}(\vec{I}_1 + \vec{I}_{C1}) \tag{22}$$

$$\vec{I}_{C1} = \vec{Y}_{C1}\vec{E}_1 \tag{23}$$

An output voltage $\vec{E}_{O1}$ from the PWM converter is represented using a gain $K_1$ and transfer functions $\vec{G}_1$ and $\vec{H}_1$ in the capacitor voltage control, as in the following equation.

The control signal formed of gain $K_1$ and transfer functions $\vec{G}_1$ and $\vec{H}_1$ is a voltage reference signal of the PWM converter. In this case, the gain between the voltage reference signal and the main circuit voltage is 1. In other words, it is considered that the gain between the voltage reference signal and the main circuit voltage is already included in gain $K_1$ and transfer functions $\vec{G}_1$ and $\vec{H}_1$.

$$\vec{E}_{O1} = \vec{H}_1\{K_1\vec{E}_{ref1} + \vec{G}_1(\vec{E}_{ref} - \vec{E}_1) - \vec{I}_{C1}\} = \vec{H}_1\{(K_1 + \vec{G}_1)\vec{E}_{ref1} - \vec{G}_1\vec{E}_1 - \vec{I}_{C1}\} \tag{24}$$

When the equation (23) is applied and arranged, the following equation is obtained.

$$\vec{E}_{O1} = \vec{H}_1\{(K_1 + \vec{G}_1)\vec{E}_{ref1} - (\vec{G}_1 + \vec{Y}_{C1})\vec{E}_1\} \tag{25}$$

The above equation is substituted into the equation (22) to represent $\vec{E}_1$ as a function of $\vec{E}_{ref1}$ and $\vec{I}_1$.

$$\vec{H}_1\{(K_1 + \vec{G}_1)\vec{E}_{ref1} - (\vec{G}_1 + \vec{Y}_{C1})\vec{E}_1\} - \vec{E}_1 = \vec{Z}_{01}(\vec{I}_1 + \vec{Y}_{C1}\vec{E}_1) \tag{26}$$

$$\vec{H}_1(K_1 + \vec{G}_1)\vec{E}_{ref1} - \vec{H}_1(\vec{G}_1 + \vec{Y}_{C1})\vec{E}_1 - \vec{E}_1 = \vec{Z}_{01}\vec{I}_1 + \vec{Z}_{01}\vec{Y}_{C1}\vec{E}_1$$

$$\{\vec{H}_1(\vec{G}_1 + \vec{Y}_{C1}) + 1 + \vec{Z}_{01}\vec{Y}_{C1}\}\vec{E}_1 = \vec{H}_1(K_1 + \vec{G}_1)\vec{E}_{ref1} - \vec{Z}_{01}\vec{I}_1$$

$$\vec{E}_1 = \frac{\vec{H}_1(K_1 + \vec{G}_1)\vec{E}_{ref1} + \vec{Z}_{01}\vec{I}_1}{\vec{H}_1(\vec{G}_1 + \vec{Y}_{C1}) + 1 + \vec{Z}_{01}\vec{Y}_{C1}}$$

$$\vec{E}_1 = \frac{\vec{H}_1(K_1 + \vec{G}_1)}{\vec{H}_1(\vec{G}_1 + \vec{Y}_{C1}) + 1 + \vec{Z}_{01}\vec{Y}_{C1}}\vec{E}_{ref1} - \frac{\vec{Z}_{01}}{\vec{H}_1(\vec{G}_1 + \vec{Y}_{C1}) + 1 + \vec{Z}_{01}\vec{Y}_{C1}}\vec{I}_1$$

In this case, assuming that the coefficient of $\vec{E}_{ref1}$ is defined as $\vec{A}_1$ and the coefficient of $\vec{I}_1$ is defined as $\vec{B}_1$, the following equation is obtained.

$$\vec{E}_1 = \vec{A}_1\vec{E}_{ref1} + \vec{B}_1\vec{I}_1 \tag{27}$$

Furthermore, when the equation (21) is substituted into $\vec{E}_{ref1}$, the following equation is obtained.

$$\vec{E}_1 = \vec{A}_1(\vec{E}_{refL} + \vec{Z}_1\vec{I}_1) + \vec{B}_1\vec{I}_1$$

Accordingly, the following equation is calculated.

$$\vec{E}_1 = \vec{A}_1(\vec{E}_{refL} + \vec{Z}_1\vec{I}_1) + \vec{B}_1\vec{I}_1 = \vec{A}_1\vec{E}_{refL} + (\vec{A}_1\vec{Z}_1 + \vec{B}_1)\vec{I}_1 \tag{28}$$

When the equivalent circuit in FIG. 9 is represented using the above equation, the circuit can be described as shown in FIG. 13.

FIG. 13 shows the configuration that is basically the same as that in FIG. 3 described above.

FIG. 13 is different in configuration from FIG. 3 in that, as a voltage source, a coefficient $\vec{A}_1$ formed of a circuit constant and a control gain/transfer function is multiplied by a load voltage command $\vec{E}_{refL}$.

Furthermore, FIG. 13 is different from FIG. 3 in that $\vec{A}_1 \vec{Z}_1 + \vec{B}_1$ is connected as an equivalent impedance in series to the impedance of the voltage source and the load.

Figure 14:
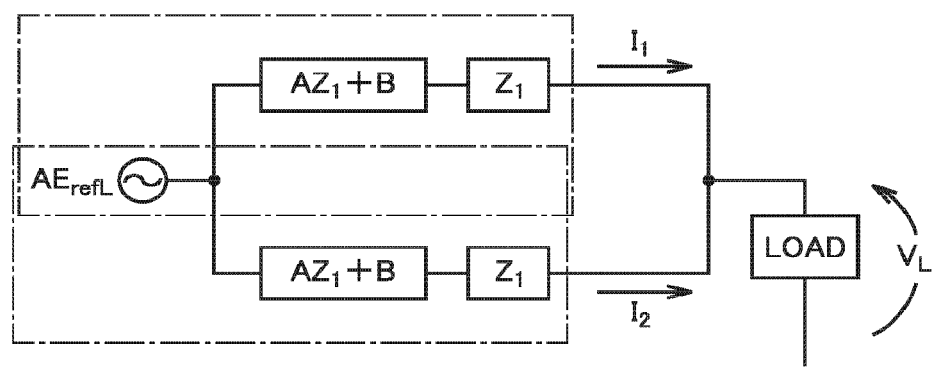
FIG. 14 is a diagram illustrating an equivalent circuit according to the second embodiment.

FIG. 14 is a diagram illustrating an equivalent circuit according to the second embodiment.

As shown in FIG. 14, when two AC output converters are equal in control gain/transfer function and circuit impedance in the configuration shown FIG. 13, $\vec{Z}_1 = \vec{Z}_2$, $\vec{A}_1 = \vec{A}_2 = \vec{A}$, and $\vec{B}_1 = \vec{B}_2 = \vec{B}$ are established.

Similarly to the description in the first embodiment, also as in the second embodiment, the current share can be controlled between two AC output converters, so that the current can be balanced.

Furthermore, by maintaining the relation of the following equation regarding the circuit impedance and the control gain/transfer function, the current share can be set at an optional ratio h between two AC output converters.

$$\vec{Z}_2 = h\vec{Z}_1, \vec{Z}_{02} = h\vec{Z}_{01}, C_2 = C_1/h(\vec{Y}_{C2} = \vec{Y}_{C1}/h), K_2 = K_1/h,$$
$$\vec{H}_2 = h\vec{H}_1, \vec{G}_2 = \vec{G}_1/h \quad (29)$$

When this relation is established, coefficients $\vec{A}_2$ and $\vec{B}_2$ of the second AC output converter are calculated.

$$\vec{A}_2 = \frac{\vec{H}_2(K_2 + \vec{G}_2)}{\vec{H}_2(\vec{G}_2 + \vec{Y}_{C2}) + 1 + \vec{Z}_{02}\vec{Y}_{C2}} = \quad (30)$$

$$\frac{h\vec{H}_1(K_1/h + \vec{G}_1/h)}{h\vec{H}_1(\vec{G}_1/h + \vec{Y}_{C1}/h) + 1 + h\vec{Z}_{01}\cdot\vec{Y}_{C1}/h} =$$

$$\frac{\vec{H}_1(K_1 + \vec{G}_1)}{\vec{H}_1(\vec{G}_1 + \vec{Y}_{C1}) + 1 + \vec{Z}_{01}\vec{Y}_{C1}} = \vec{A}_1$$

$$\vec{B}_2 = \frac{\vec{Z}_{02}}{\vec{H}_2(\vec{G}_2 + \vec{Y}_{C2}) + 1 + \vec{Z}_{02}\vec{Y}_{C2}} = \quad (31)$$

$$\frac{h\vec{Z}_{01}}{h\vec{H}_1(\vec{G}_1/h + \vec{Y}_{C1}/h) + 1 + h\vec{Z}_{01}\cdot\vec{Y}_{C1}/h} =$$

$$\frac{h\vec{Z}_{01}}{\vec{H}_1(\vec{G}_1 + \vec{Y}_{C1}) + 1 + \vec{Z}_{01}\vec{Y}_{C1}} = h\vec{B}_1$$

Equation (30) shows that the magnitudes of the voltage sources in the equivalent circuits of two AC output converters are equal to each other when the relation of the equation (29) is established.

Furthermore, the equation (31) shows that the equivalent impedance of the second AC output converter is h times higher than that of the first AC output converter.

Figure 15:
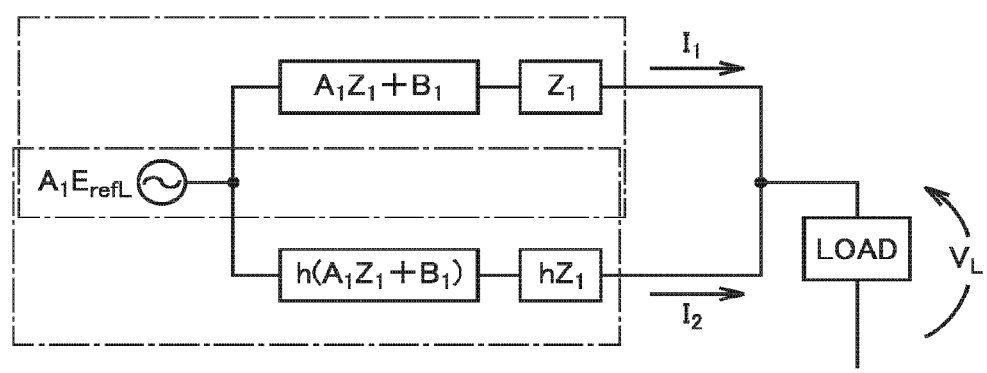
FIG. 15 is a diagram illustrating another equivalent circuit according to the second embodiment.

FIG. 15 is a diagram illustrating another equivalent circuit according to the second embodiment.

As shown in FIG. 14, the following equation is established between $\vec{I}_1$ and $\vec{I}_2$ when the relation of the equation (28) is established.

$$\vec{A}_1\vec{E}_{refL} + (\vec{A}_1\vec{Z}_1 + \vec{B}_1 + \vec{Z}_1)\vec{I}_1 = \vec{A}\vec{E}_{refL} + h(\vec{A}_1\vec{Z}_1 + \vec{B}_1 + \vec{Z}_1)\vec{I}_2\vec{I}_1 = h\vec{I}_2 \quad (32)$$

Accordingly, by adjusting the circuit impedance and the control gain/transfer function as appropriate, the current share between two AC output converters can be adjusted.

Figure 16:
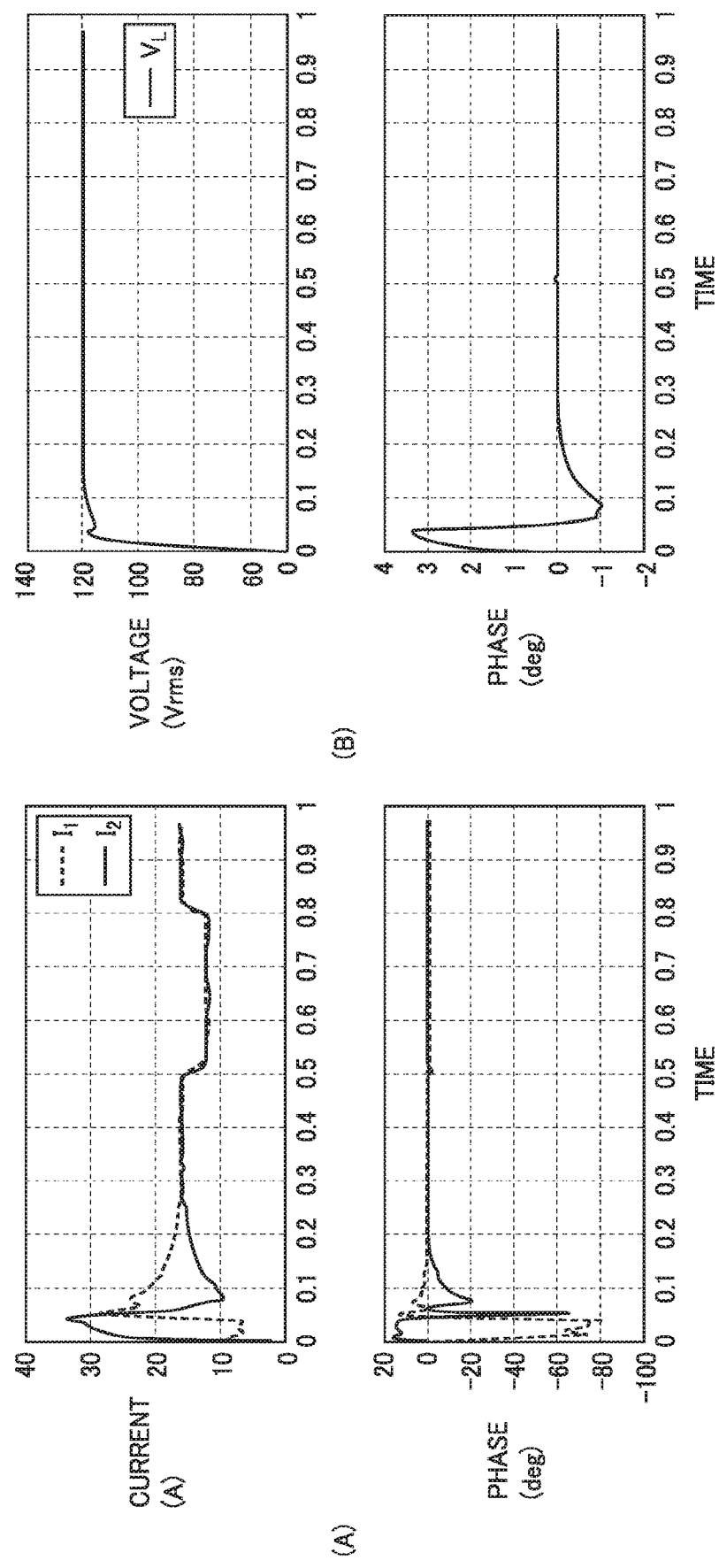
FIG. 16 is a diagram illustrating the simulation result of uninterruptible power supply system 1# according to the second embodiment.

FIG. 16 is a diagram illustrating the simulation result of uninterruptible power supply system 1# according to the second embodiment.

FIG. 16 (A) shows the effective value and the phase of the representative phase of the output current from each of AC output converters 11A and 11B. It shows that, after two AC output converters are started at zero on the time axis, the current share becomes equal in about 0.3 seconds to 0.4 seconds. It also shows that the current share is thereafter maintained even when the load is reduced after a lapse of 0.5 seconds or when the load is changed to the original value again after a lapse of 0.8 seconds.

FIG. 16 (B) shows the effective value and the phase of the load voltage. It shows that the load voltage is maintained at an approximately fixed voltage in the steady state even though load fluctuations occur.

In the present simulation, since AC output converters 11A and 11B are provided with the same capacitor voltage control circuit, these output converters are operated by the same capacitor voltage command. Thus, the capacitor voltages on two AC output converters 11A and 11B are controlled to be the same. Even if the output currents from two AC output converters 11A and 11B are unbalanced due to some factors, the output currents are controlled so as to be eventually balanced.

In addition, the voltage on the bus connected to the load is information common to two AC output converters and also can be independently detected. By the reference phase obtained in this way, the same functions and effects as those in the first embodiment can be achieved.

Therefore, also in the present embodiment, the AC output converters can perform control using only the signals that can be observed by their respective devices, so that the current balance between the AC output converters can be controlled. Furthermore, since the control is performed only by the controllers included in their respective AC output converters, it becomes possible to eliminate the need to provide: a controller common to a plurality of AC output converters; and the signal transmitting/receiving means between the AC output converters.

First Modification of Second Embodiment

The configuration using the load-side reactor in the LCL filter as an output impedance has been explained in the above description. In this case, even in the configuration including a transformer provided in place of the load-side reactor, the short-circuit impedance (leakage impedance) of the output transformer is equivalent to the reactor, so that the similar effect can be achieved.

Figure 17:
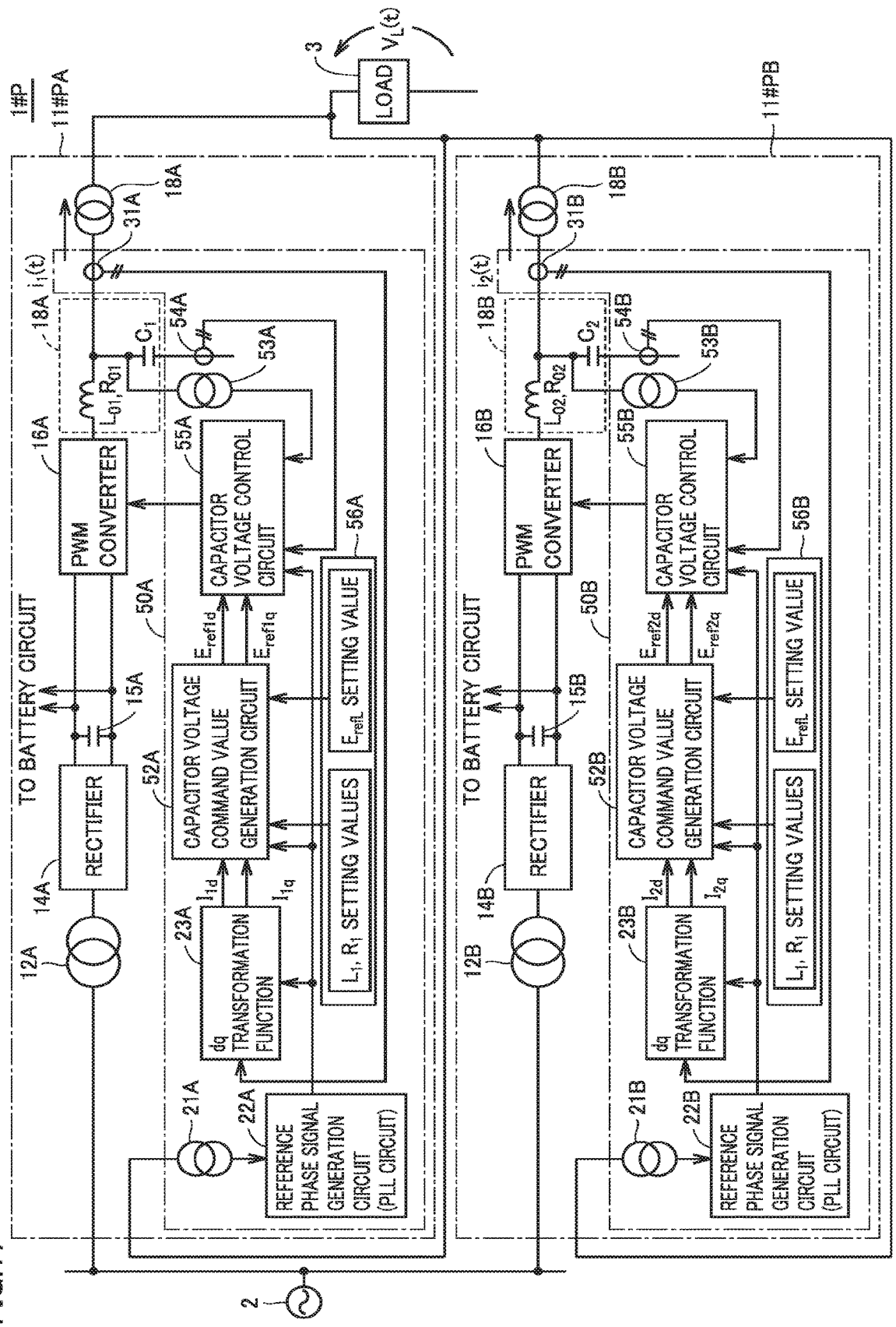
FIG. 17 is a diagram illustrating the configuration of an uninterruptible power supply system 1#P according to the first modification of the second embodiment.

FIG. 17 is a diagram illustrating the configuration of an uninterruptible power supply system 1#P according to the first modification of the second embodiment.

As shown in FIG. 17, uninterruptible power supply system 1#P is different from uninterruptible power supply system 1# in that AC output converter 11A is replaced with an AC output converter 11#PA while AC output converter 11B is replaced with an AC output converter 11#PB.

AC output converter 11#PA is different from AC output converter 11A in that the reactor of LCL filter 18A is eliminated and transformer 18A is provided in place of the reactor. Current detector 31A is provided between the filter and transformer 18A. Since other configurations are the same as those described in FIG. 1, the detailed description thereof will not be repeated.

Furthermore, AC output converter 11#PB is different from AC output converter 11B in that the reactor of LCL filter 18B is eliminated and transformer 18B is provided in place of the reactor. Current detector 31B is provided between the filter and transformer 18B. Since other configurations are the same as those described in FIG. 1, the detailed description thereof will not be repeated.

The present configuration can also achieve the same effect as that in the first embodiment. Also, current detector 31A may be provided between AC load 3 and transformer 18A while current detector 31B may be provided between AC load 3 and transformer 18B.

Second Modification of Second Embodiment

Figure 18:
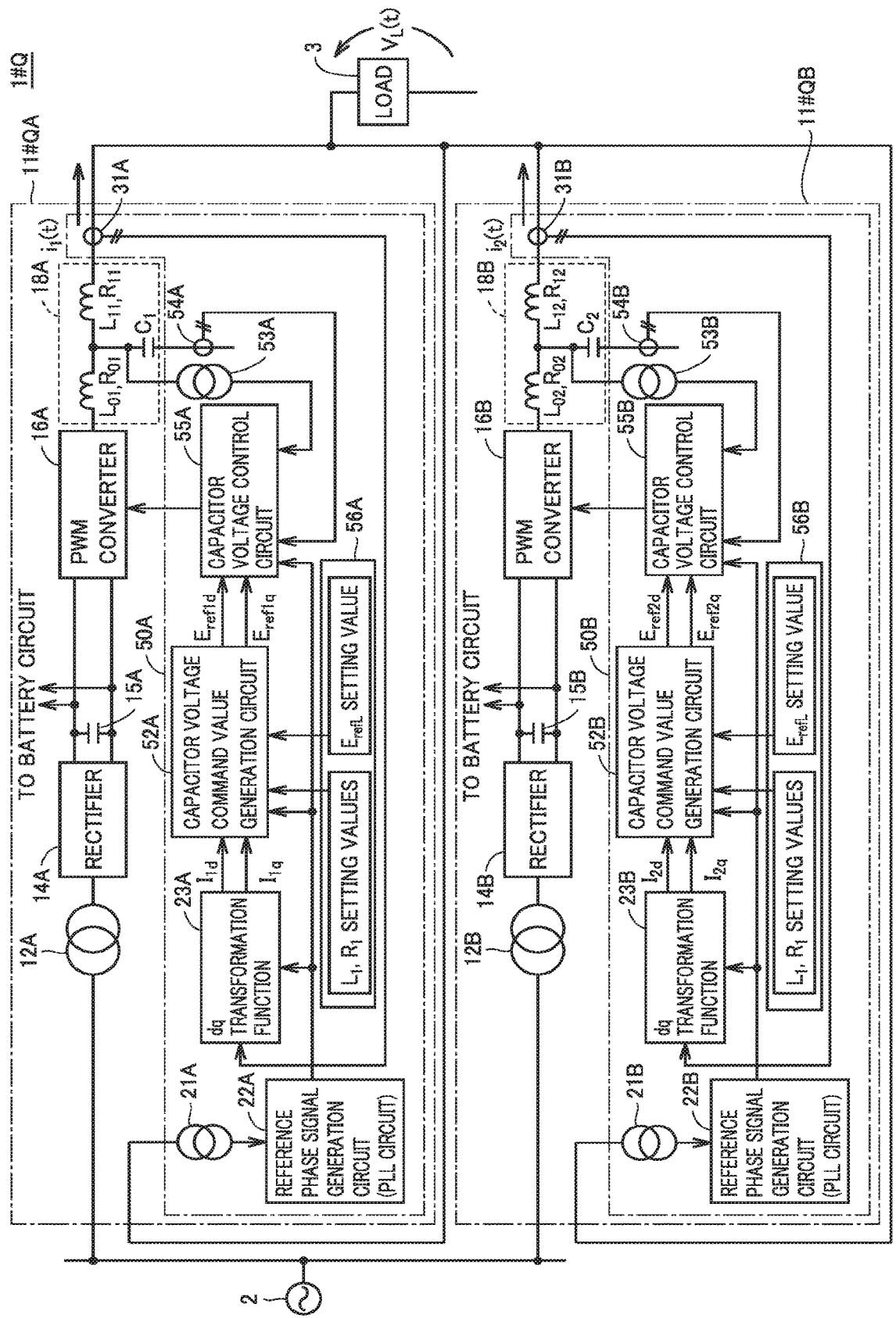
FIG. 18 is a diagram illustrating the configuration of an uninterruptible power supply system 1#Q according to the second modification of the second embodiment.

FIG. 18 is a diagram illustrating the configuration of an uninterruptible power supply system 1#Q according to the second modification of the second embodiment.

Referring to FIG. 18, uninterruptible power supply system 1#Q is different from uninterruptible power supply system 1# in FIG. 10 in that AC output converter 11A is replaced with an AC output converter 11#QA while AC output converter 11B is replaced with an AC output converter 11#QB.

AC output converter 11#QA is different from AC output converter 11A in that the reference phase is obtained from the voltage on the bus connected to load 3. Since other configurations are the same, the detailed description thereof will not be repeated.

Furthermore, AC output converter 11#QB is different from AC output converter 11B in that the reference phase is obtained from the voltage on the bus connected to load 3. Since other configurations are the same, the detailed description thereof will not be repeated. The same effect as that in the first embodiment is achieved also in the present configuration.

The same effect as that in the second embodiment is achieved also in the present configuration.

Furthermore, the voltage on the bus connected to the load is also regarded as information that is common to two AC output converters and that is detectable by two AC output converters independently.

Accordingly, the same effect as that in the second embodiment can be achieved.

Third Embodiment

Figure 19:
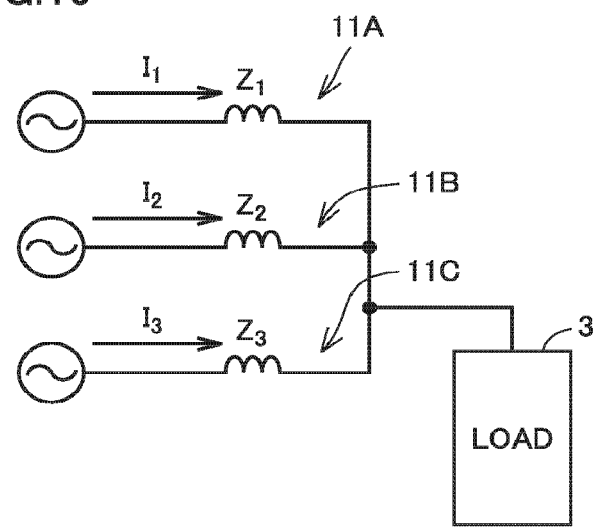
FIG. 19 is a diagram schematically showing the configuration of an uninterruptible power supply system according to the third embodiment.

FIG. 19 is a diagram schematically showing the configuration of an uninterruptible power supply system according to the third embodiment.

FIG. 19 schematically shows the case where three different AC output converters are applied. For example, the case where AC output converters 11A, 11B and 11C are provided will be described.

The present example shows a configuration in which three AC output converters 11A, 11B and 11C are different in capacity from one another, and the impedances of load-side reactor $L_1$ in LCL filter 18 are defined as $\vec{Z}_1$, $\vec{Z}_2$ and $\vec{Z}_3$.

For example, an explanation will be hereinafter given with regard to the case where the impedance ratio of AC output converters 11A, 11B and 11C is set at $\vec{Z}_1:\vec{Z}_2:\vec{Z}_3=1:1.25:1.5$ and also the case were the ratio of the transfer functions are similarly adjusted.

Figure 20:
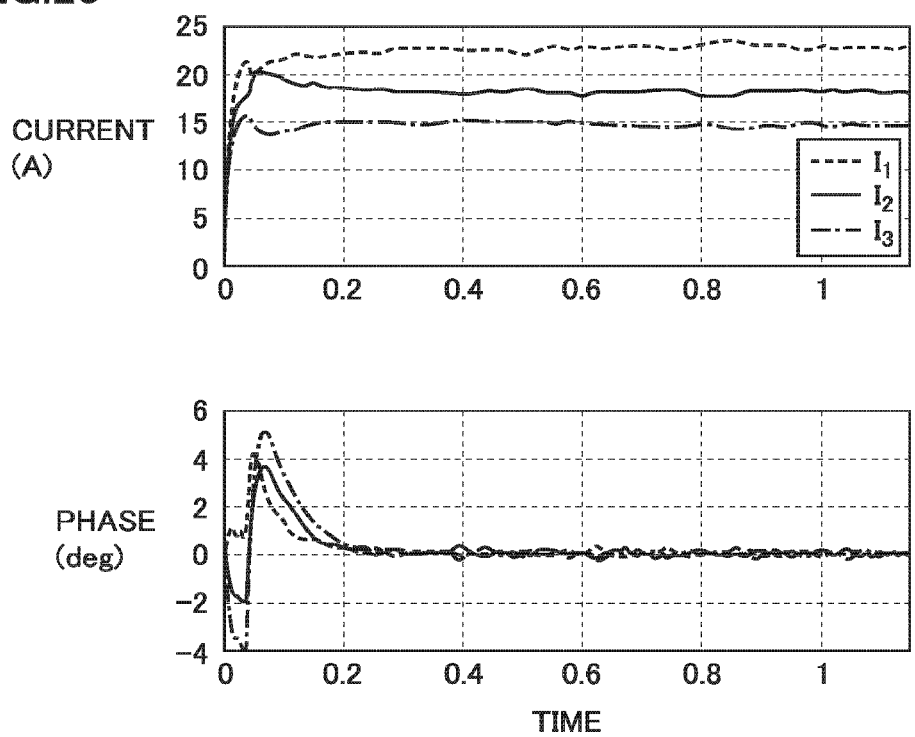
FIG. 20 is a diagram illustrating the simulation result of an uninterruptible power supply system 1# according to the third embodiment.

FIG. 20 is a diagram illustrating the simulation result of an uninterruptible power supply system 1# according to the third embodiment.

As shown in FIG. 20, it was confirmed that, in this configuration, the ratio of the output currents from AC output converters 11A, 11B and 11C is inversely proportional to the impedance ratio and controlled so as to be $\vec{I}_1:\vec{I}_2:\vec{I}_3=1.5:1.25:1$.

Therefore, also in the present embodiment, the AC output converters can perform control using only the signals that can be observed by their respective devices, so that the current balance among the AC output converters can be controlled.

Furthermore, even when the values of the impedances of the load-side reactors in the AC output converters are different, the voltage command values are produced accordingly, so that the current can be controlled to be distributed according to each of the AC output converters even in the case where the AC output converters having different capacities are arranged in parallel.

Although the embodiments of the present invention have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

REFERENCE SIGNS LIST 1, 1P, 1#, 1#P uninterruptible power supply system, 2 AC power supply, 3 load, 10, 10A, 10B, 11, 11A, 11B AC output converter, 12A, 12B transformer, 14A, 14B rectifier, 15A, 15B DC capacitor, 16A, 16B PWM converter, 17A, 17B output impedance, 18A, 18B LCL filter, 20A, 20B, 50A, 50B controller, 21A, 21B, 53A, 53B voltage detector, 22A, 22B reference phase signal generation circuit, 23A, 23B dq transformation function, 24A, 24B, 60 vector multiplier, 25A, 25B gain function, 26A, 26B, 70 vector adder, 27A, 27B, 92 inverse dq transformation function, 28A, 28B, 93 PWM pulse generator, 29A, 29B, 30A, 30B, 56A, 56B register, 31A, 31B, 54A, 54B current detector, 52A, 52B capacitor voltage command value generation circuit, 55A, 55B capacitor voltage control circuit.

The invention claimed is:
1. A power supply system comprising:
a plurality of AC output converters connected in parallel for supplying electric power to an AC load,
each of the plurality of AC output converters including
an output impedance connected to the AC load,
a PWM converter configured to convert DC power into AC power, and
a controller configured to output a voltage command value to the PWM converter,
the controller including
a vector adder configured to perform vector addition of a part of a voltage drop occurring due to a current flowing through the output impedance and a voltage command value of the AC load, and
a converter configured to output the voltage command value to the PWM converter based on a vector sum obtained through the vector addition.
2. The power supply system according to claim 1, wherein the output impedance is formed of a reactor.

3. The power supply system according to claim 1, wherein the output impedance is formed of a leakage inductance of a transformer.

4. The power supply system according to claim 1, wherein the controller includes a vector multiplier, and
the vector multiplier is configured to calculate a part of the voltage drop by multiplying a product of a value of the output impedance and the current flowing through the output impedance by a coefficient smaller than approximately one.

5. The power supply system according to claim 1, wherein the controller includes
a detector configured to detect the current flowing through the output impedance, and
a reference phase signal generation circuit configured to generate a reference phase signal in synchronization with an AC system voltage, the reference phase signal being for detecting a current component from a detection result of the detector.

6. The power supply system according to claim 1, wherein the controller includes
a detector configured to detect the current flowing through the output impedance, and
a reference phase signal generation circuit configured to generate a reference phase signal in synchronization with a voltage on a bus connected to the AC load, the reference phase signal being for detecting a current component from a detection result of the detector.

7. A power supply system comprising:
a plurality of AC output converters connected in parallel for supplying electric power to an AC load,
each of the plurality of AC output converters including
an LCL filter connected to the AC load,
a PWM converter configured to convert DC power into AC power, and
a controller configured to output a voltage command value to the PWM converter,
the controller including
a detector configured to detect a voltage on a capacitor of the LCL filter,
a signal generation circuit configured to generate a voltage reference signal by performing vector addition of a part of a voltage drop occurring due to a current flowing through a reactor and a voltage command value of the AC load, the reactor being provided close to the AC load in the LCL filter, and
a voltage controller configured to output the voltage command value to the PWM converter such that the voltage reference signal is equal to the voltage on the capacitor detected by the detector.

8. The power supply system according to claim 7, wherein the reactor provided close to the AC load in the LCL filter is formed of a leakage inductance of a transformer.

9. The power supply system according to claim 7, wherein the signal generation circuit is configured to perform vector addition of a vector product of an impedance of the reactor connected to the AC load of the LCL filter and the current flowing through the reactor, and the voltage command value of the AC load.

10. The power supply system according to claim 7, wherein
the controller includes
a detector configured to detect the current flowing through the reactor, and
a reference phase signal generation circuit configured to generate a reference phase signal in synchronization with an AC system voltage, the reference phase signal being for detecting a current component from a detection result of the detector.

11. The power supply system according to claim 7, wherein
the controller includes
a detector configured to detect a current flowing through an output impedance, and
a reference phase signal generation circuit configured to generate a reference phase signal in synchronization with a voltage on a bus connected to the AC load, the reference phase signal being for detecting a current component from a detection result of the detector.

* * * * *